US012700559B2

(12) United States Patent
Signer et al.

(10) Patent No.: US 12,700,559 B2
(45) Date of Patent: Aug. 4, 2026

(54) ELECTRICAL FUSE

(71) Applicant: SCHURTER AG, Lucerne (CH)

(72) Inventors: Guido Signer, Neuenkirch (CH); Arbnor Hoti, Zug (CH)

(73) Assignee: SCHURTER AG, Lucerne (CH)

( * ) Notice: Subject to any disclaimer, the term of this patent is extended or adjusted under 35 U.S.C. 154(b) by 248 days.

(21) Appl. No.: 18/697,624

(22) PCT Filed: Oct. 15, 2021

(86) PCT No.: PCT/EP2021/078674
§ 371 (c)(1),
(2) Date: Apr. 1, 2024

(87) PCT Pub. No.: WO2023/061611
PCT Pub. Date: Apr. 20, 2023

(65) Prior Publication Data
US 2024/0412936 A1 Dec. 12, 2024

(51) Int. Cl.
*H01H 85/175* (2006.01)
*H01H 69/02* (2006.01)
*H01H 85/041* (2006.01)
*H01H 85/18* (2006.01)
*H01H 85/38* (2006.01)

(52) U.S. Cl.
CPC .......... *H01H 85/175* (2013.01); *H01H 69/02* (2013.01); *H01H 85/041* (2013.01); *H01H 85/18* (2013.01); *H01H 85/38* (2013.01)

(58) Field of Classification Search
CPC ....... H01H 85/165-1755; H01H 69/02; H01H 85/041; H01H 85/18; H01H 85/38; H01H 85/10
See application file for complete search history.

(56) References Cited

U.S. PATENT DOCUMENTS 5,296,832 A * 3/1994 Perreault .............. H01H 85/153 337/201
6,275,135 B1 * 8/2001 Hibayashi .......... H01H 85/1755 337/252
11,127,555 B1 * 9/2021 Ide ..................... H01H 85/1755
(Continued)

FOREIGN PATENT DOCUMENTS

WO 2021/151498 A1 8/2021

*Primary Examiner* — Jacob R Crum
(74) *Attorney, Agent, or Firm* — Rothwell, Figg, Ernst & Manbeck, P.C.

(57) ABSTRACT

An electrical fuse (100) comprising: —an electrical conductor element (108) comprising a melting section (110) and further comprising a first extension section (112) and a second extension section (114) both integrally formed with the melting section (110) and extending from both ends of the melting section (110) in the lengthwise direction thereof, —an electrically insulating, multi-part housing (102), which encloses said melting section (110) in an interior space (116), wherein the multi-part housing (102) comprises a first part (104) and a second part (106) slidingly engaged with said first part (104) and arranged such that the second part (106) covers an access opening (118) of the first part to the interior space (116), and wherein the first extension section (112) and second extension section (114) comprise a terminal area, respectively, both terminal areas are arranged outside the multi-part housing (102).

11 Claims, 26 Drawing Sheets

(56) References Cited

U.S. PATENT DOCUMENTS

Figure 1A:
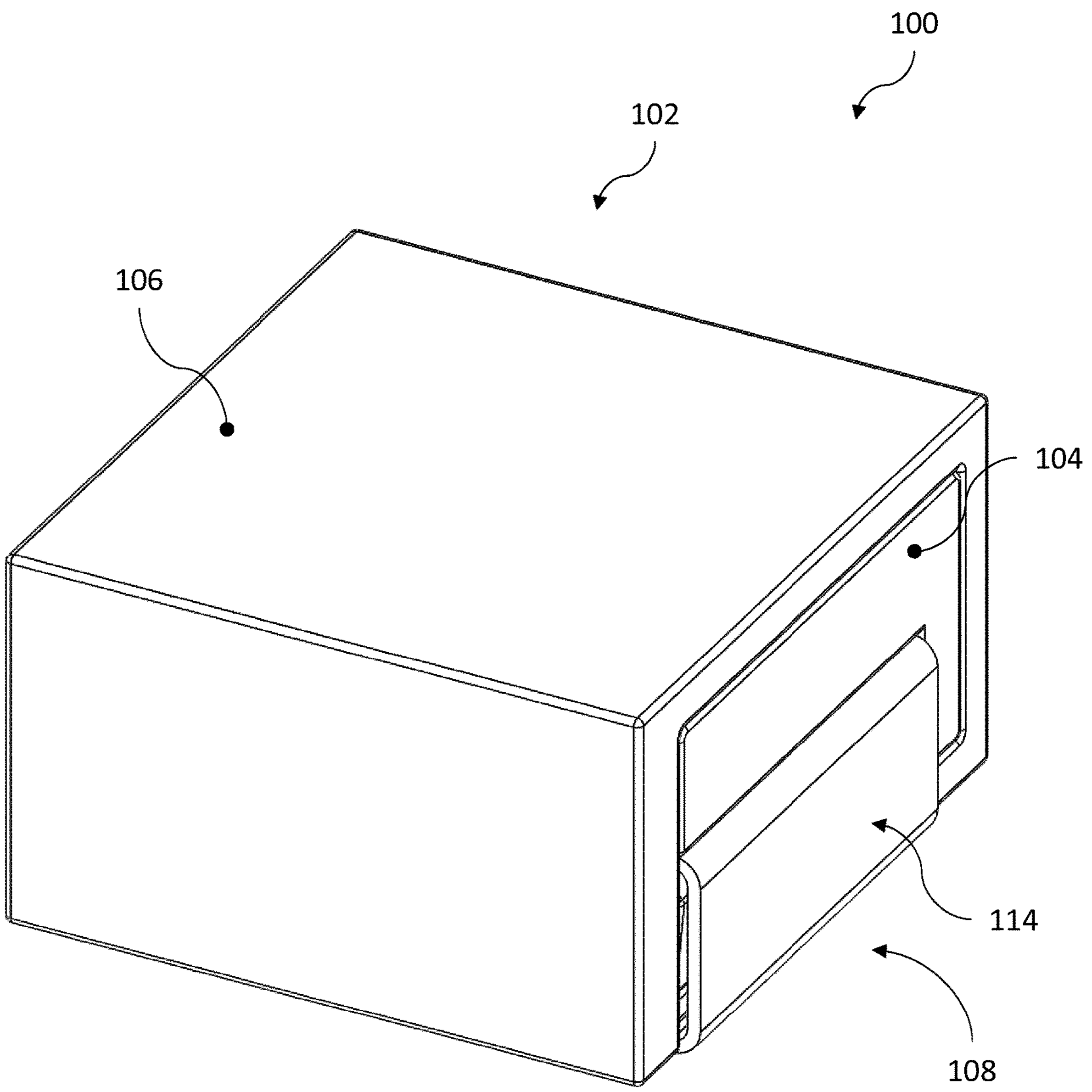

| | | | | |
|---|---|---|---|---|
| 2010/0102920 | A1* | 4/2010 | Stanek | H01H 85/0013 337/186 |
| 2012/0133478 | A1* | 5/2012 | Chiu | H01H 85/165 337/228 |
| 2017/0263407 | A1* | 9/2017 | Schlaak | H01H 85/185 |
| 2018/0294126 | A1 | 10/2018 | de Leon et al. | |
| 2021/0210300 | A1 | 7/2021 | Chiu et al. | |

* cited by examiner

ELECTRICAL FUSE

CROSS REFERENCE TO RELATED APPLICATION

This application is a 35 U.S.C. 371 National Phase Entry Application from PCT/EP2021/078674, filed Oct. 15, 2021, the disclosure of which is incorporated herein by reference in its entirety.

The present invention relates to an electrical fuse and to a method of manufacturing an electrical fuse.

A known type of fuses comprises a tubular insulating housing with electrically conducting end caps on both ends of the tubular housing. A fusible wire extending through the inside of the housing connects the two end caps. The fusible wire is dimensioned such that it melts when a predefined, maximum allowable electrical current flows through the wire. The connection between the wire and the end caps may be prone to failure, i.e. the connection between the wire and the end cap may break at lower current than the rated current. The higher the rated current is, the more difficult is gets to avoid such premature triggering of a fuse with high reliability.

Unpublished document PCT/EP2020/052356 discloses an electrical fuse comprising an electrically insulating housing with walls surrounding an interior space, with a first opening and a second opening opposite to the first opening, and an integrally formed electrical conductor element extending from a first terminal area outside the housing, across the first opening, across the interior space, across the second opening and to a second terminal area outside the housing. A first sealing section of the conductor element seals the first opening, and a second sealing section of the conductor element seals the second opening.

It is a problem in the state of the art in assembling the fuse that inserting the conductor element across both openings is cumbersome. Further, filling the interior space with a filling material, e.g. an arc quenching material, via one of the openings can be cumbersome, too. In order to solve said problems, the state of the art proposes to form the cross-section of the second opening larger than the cross-section of the first opening. Hence, a funnel type geometry of the interior space can be achieved, designed such to allow guidance of an end of the conductor element inserted through the larger second opening into and through the more tightly dimensioned first opening. Further, the interior space can be filled with the arc quenching material via the second opening. The second opening is sealed by a sealing section comprised by the conductor element itself. It is a problem in the prior art that connecting means must be provided in order to hinder movement of said sealing section. Said connecting means can comprise providing the sealing section with a protrusion projecting towards the interior space. However, provision of said connecting means is costly and requires additional manufacturing steps. Further, mounting the sealing section to the housing is cumbersome.

The object of the present invention is to provide an alternative electrical fuse avoiding at least a problem of the state of the art. A more specific object of the invention is to provide an electrical fuse which is simple in manufacturing.

This object is achieved by an electrical fuse according to claim 1. Further provided is a method of manufacturing an electrical fuse according to claim 11.

As per definition, electrical fuses are protective devices used in broad areas of electrotechnics. Electrical fuses are for example constructed such that current flows through a part of fusible material, and the current is interrupted by displacement of the fusible material when this current becomes excessive. It is desired that electrical fuses are reliable in the sense that the current is surely interrupted above a predefined maximum allowable electrical current. In addition, the electrical fuse should not interrupt an electrical circuit at lower current values, which correspond to normal operation conditions. Further, as per definition, thermal fuses are designed to interrupt current when a nearby temperature becomes excessive. Electrical fuses which can combine the principles of a current-limiting fuse and thermal fuse are conceivable.

The electrical fuse according to the present invention comprises an electrical conductor element comprising a melting section and further comprising a first extension section and a second extension section both integrally formed with the melting section and extending from both ends of the melting section in the lengthwise direction thereof, an electrically insulating, multi-part housing, which encloses said melting section in an interior space, wherein the multi-part housing comprises a first part and a second part slidingly engaged with said first part and arranged such that the second part covers an access opening of the first part to the interior space, and wherein the first extension section and second extension section comprise a terminal area, respectively, both terminal areas are arranged outside the multi-part housing.

The multi-part housing may be a two-part housing, the two parts of the two-part housing being said first and said second part of the electrically insulating housing. First and second parts of the housing may be slidingly engaged as the parts of a matchbox are slidingly engaged or as a drawer is slidingly engaged into the respective compartment of a piece of furniture. In this analogy, the first part having the access opening corresponds to the inner part of the matchbox or the drawer, respectively. The access opening of the first part may be oriented such that a sliding movement of the first part with respect to the second part occurs in a direction parallel to the access opening. As an alternative, the sliding direction of the sliding engagement may be oriented perpendicular to the access opening of the first part. The second part may then form a cap or a lid for the first part.

Advantageously, the electrical fuse according to the present invention may be realized in a very simple configuration making use of solely three elements, namely the first part, the second part and the electrical conductor element surrounded by the multi-part housing at least in the region of the melting section. Surprisingly, even in this simple configuration, the interior space of the multi-part housing can be properly sealed, and the first part and second part can be properly attached to each other even without the provision of further connection means.

In an initial step of assembling, the electrical conductor element can be engaged with the first part by at least guiding the electrical conductor element through one opening of said first part. Said assembling of the electrical conductor element to the first part can be achieved easily since the electrical conductor element is required to be guided through solely one opening which avoids threading efforts. Afterwards, the first part equipped with the electrical conductor element can be engaged with the second part by sliding engagement. This sliding engagement allows to guide the electrical conductor element through an opening of the second part without expending threading efforts.

The interior space of the multi-part housing may be empty, except from the part of the conductor element crossing the interior space. Alternatively, the interior space may be filled with a filling material comprising e.g. an arc quenching material. An arc quenching material is suitable for electrical fuses designed for interrupting high system voltages. Arc quenching material is also suitable for electrical fuses designed for high maximum allowable electrical currents, such as currents in the 100 amperes (100 A) range and above, such as up to 2000 amperes or even up to 10000 amperes (10 kA), may be sand, in particular quartz sand. Thus, the electrical fuse is adapted to be used in a high current or in an ultra-high current regime. The latter current regime may be particularly useful, as in the near future batteries and accumulators having short circuit currents in this range will be available. Nominal currents in the range of 50 A to 500 A and breaking capacity up to 10 kA will be needed in this context and can be provided by a fuse according to the invention. It is to be noted that arc quenching material may be needed, e.g. at 32 volts involving full short-circuit current. Arc quenching material may be needed except at low voltages, e.g. 16 volts, at e.g. 32 volts involving reduced currents, starting from high voltages, e.g. 48 volts, and involving very low over-currents.

Furthermore, advantageously, attaching the first part and the second part of the multi-part housing to each other can be achieved by the electrical conductor element itself, e.g. by bending a protruding portion thereof once the first part and second part are engaged. Hence, additional connecting means, such as e.g. gluing, soldering, etc. can be omitted.

As the conductor element is electrically conducting and integrally formed, the conductor element forms a single-piece fusible element, which can at the same time provide the functionality of terminal areas, e.g. first and second terminal areas, of the fuse. Said terminal areas may be formed by the conductor element, e.g. directly formed by the first and second extension sections, respectively. Alternatively, they may be at least partially or fully covered by one or multiple layers, such as e.g. a tin, nickel, gold or a silver layer, such that the terminal areas can be easily connected to a corresponding conductor pad by soldering. As an alternative, means may be provided to connect the terminals to a corresponding conductor by welding, screwing or riveting.

In an example, the first terminal area and second terminal area are coplanar. The term "terminal areas being coplanar" can have the meaning that the first terminal area and the second terminal area are arranged spaced from each other in a common plane. This aspect is particularly suitable for a fuse designed as surface mountable device (SMD) i.e. suited for leadless application, also denoted as surface mountable technology (SMT). The terminal areas may be arranged on a single side, e.g. the bottom side of the multi-part housing, and facing away from the multi-part housing. This way, the electrical fuse may be placed on a printed circuit board and the first and second terminal areas may be soldered to soldering pads on the printed circuit board by reflow soldering. Compared to known so-called blade-fuses regularly applied in automotive applications, electrical fuses according to the present embodiment have the advantage, that they can be automatically placed on printed circuit boards and that they may be soldered by a standard reflow process, whereas blade-fuse need to be mounted by hand, typically at the very end of the production chain, which leads to relatively high cost.

In an example, the terminal areas can be bent to sides of the multi-part housing opposing each other, e.g. to a front face and to rear face of the multi-part housing or e.g. to lateral sides of the multi-part housing. In this example, a series connection to adjacent components, e.g. components to be protected against over-current, on e.g. a printed circuit board can be achieved. In other words, the electrical fuse can be used like a cartridge fuse.

The terminal areas are spaced from each other and allow to connect the electrical fuse in series with an electrical device, which shall be protected from excessive current. The electrical fuse has two states, the conducting state and the blown state. In the conducting state, i.e. in the original, not blown state, the conductor element provides electrical contact between the terminal areas. Once the fuse is blown, i.e. once the melting section of the conductor element is molten away due to a current exceeding the predefined maximum allowable electrical current, the electrical connection between the terminal areas is interrupted. The electrical fuse according to the invention is a non-resettable fuse, i.e. it will not return to the conducting state. There exists no reset mechanism.

The melting section of the conductor element may be realized by a reduced cross-section, in particular, by a reduced thickness of the conductor element, by a reduced width of the conductor element, by a separation of the conductor element into two or more parallel strips in the region of the melting section, by at least one indentation of at least a portion of the melting section if seen from a lateral direction of the conductor element or rather in a plane thereof, or by a combination of the previously discussed possibilities, such as e.g. a local separation into two, three or more parallel running strips, each having a reduced thickness as compared to the thickness of the conductor element before and after the separated section forming the melting section of the fuse. By varying the number of strips and the cross-section of the strips, a current-time-characteristics of the fuse may be varied according to the needs of the desired application. Further, a reduced cross-section melting section of the conductor element can be achieved by means of different recesses such as e.g. holes, etc.

In a further example, the conductor element can comprise at least one overlay arranged at least in sections within the melting section, e.g. adjacent to one of the extension sections, wherein the melting section and the overlay can each comprise materials which undergo diffusion when a predetermined ambient temperature is exceeded and when an electric current is conducted by the conductor element.

The multi-part housing advantageously prevents that drops from a molten melting section of the electrical conductor element may damage neighboring elements of the fuse or persons nearby, once the fuse is blown. The multi-part housing may be made from a material which may undergo temperature rises as they occur, when the fuse blows.

Embodiments of the present invention aim at applications making use of surface mount technology (SMT). At least in these cases the material of the housing may be selected to withstand a reflow process at a temperature of up to 260° C.

The multi-part housing may comprise different materials such as a polymer or ceramics. It may consist of a polymer containing a filler increasing the temperature stability of the multi-part housing. The multi-part housing may consist of a ceramic material. The material of the multi-part housing may be selected such that no cracks occur in the multi-part housing under thermal shock during e.g. arcing, particularly suited for this purpose are high performance thermoplastics, in particular high performance polyamides, which are fiberglass reinforced.

As per definition, the term "lengthwise" as used with respect to the conductor element in some embodiments of the present invention has the meaning that the conductor element can extend in the lengthwise direction in the initial (non-installed) state but can be bended in a later state at its extensions or rather extension sections, to be described later in further detail. Even in the latter case, at least one section of the conductor element, e.g. the melting section, can still extend in the lengthwise direction. The term "lengthwise" as used with respect to the conductor element in some embodiments of the present invention also reflects the direction of current flowing through the melting section of the conductor element.

Provided is an integrally formed electrical conductor element formed as a single piece. This means that the conductor element entails a continuous material formation without joints, such as connection points, connection lines or connections faces established e.g. by soldering, welding, or the like, or without mechanically interlocking connections. The integrally formed conductor element may receive its final form e.g. by rolling, cutting, punching, embossing or bending.

The electrical conductor element may consist of a metal, such as copper, or a metal alloy, such as a copper alloy, e.g. a bronze or brass, a silver alloy or an iron alloy, such as stainless steel. Metal alloys suitable for the electrical conductor element and having high or very high electrical conductivity, are found in the group of copper-silver alloys, copper-zirconium alloys, copper-zinc alloy, copper-magnesium alloys, copper-iron alloys, copper-chromium alloys, copper-chromium-zirconium alloys, copper-nickel-phosphorus alloys and copper-tin alloys. Alternative metal alloys suitable for the electrical conductor element and having medium electrical conductivity, are found in the group of copper-nickel-silicon alloys, copper-beryllium alloys, copper-nickel-tin alloys, copper-cobalt-beryllium alloys and copper-nickel-beryllium alloys.

Embodiments of the electrical fuse result from the features of claims 2 to 10.

In one embodiment of the electrical fuse according to the invention in a first aspect, the first part comprises a first opening and a second opening opposite to the first opening, said first and second openings being penetrated by the first and second extension sections, respectively, and wherein a wall comprised by the second part covers the access opening.

This embodiment according to the invention in the first aspect provides an electrical fuse having a multi-part housing, wherein the first part thereof comprises both, the first and second openings sealed by the electrical conductor element, and wherein the access opening can be formed widened such to allow filling the interior space with a filling material, e.g. an arc quenching material, easily. Once the first and second parts of the multi-part housing are engaged, a wall comprised by the second part covers said access opening such to reliably seal the interior space against the outside.

In one embodiment of the electrical fuse according to the invention in a second aspect, the first part comprises a first opening and the second part comprises a second opening opposite to the first opening of the first part, said first and second openings being penetrated by the first and second extension sections, respectively.

This embodiment according to the invention in the second aspect provides an electrical fuse having a multi-part housing, wherein the first part thereof comprises the first opening and the second part thereof comprises the second opening, both openings sealed by the electrical conductor element, and wherein the access opening can be formed widened such to allow filling the interior space with the filling material, easily. Once the first and second parts of the multi-part housing are engaged, a wall comprised by the second part covers said access opening such to reliably seal the interior space against the outside.

In one embodiment of the electrical fuse according to the invention, the first extension section comprised by the electrical conductor element seals said first opening, and the second extension section comprised by the electrical conductor element seals said second opening.

In one embodiment of the electrical fuse according to the invention, a cross-section of said first extension section of the electrical conductor element perpendicular to the lengthwise direction thereof corresponds in form and dimension to the cross-section of said first opening and/or the cross-section of said second extension section of the electrical conductor element perpendicular to the lengthwise direction thereof corresponds in form and dimension to the cross-section of said second opening.

As an example, the first and/or second extension sections may have a rectangular cross-section, e.g. a rectangle defined by the thickness and width of the part of the sheet metal forming the extension sections. This rectangular cross-section may be dimensioned such that it just tightly fits into the rectangular first and/or second openings of the multi-part housing. As a consequence, the interior space of the multi-part housing is properly sealed against the outside. The walls of the multi-part housing, the first extension section of the conductor element and the second extension section of the conductor element together form a dust-tight enclosure. Gaps between the multi-part housing and the first and second extension sections of the conductor element are dimensioned small enough that no dust can pass across the gaps. This prevents on the one hand dust particles from entering into the multi-part housing from outside the electrical fuse and on the other hand protects the surrounding of the electrical fuse from particles produced as consequence of blowing the fuse. Dust particles typically have diameters in the range 5 micrometers to 100 micrometers. Accordingly, the gap width may be below 100 micrometers, 50 micrometers, 5 micrometers, or even as small as 2 micrometers or 1 micrometer, in order to achieve an even higher protection level.

In an alternative embodiment of the electrical fuse according to the invention the first opening and second opening in a cross-sectional view of the multi-part housing in a plane parallel to the lengthwise direction of the melting section of the electrical conductor element are formed in a V-shape or W-shape. In this embodiment, sealing for small particles can be improved even if the manufacturing processes may not allow for openings with sufficiently small dimensions.

In one embodiment of the electrical fuse according to the invention, the conductor element is a sheet metal.

An outer contour of the conductor element may be formed by punching or cutting, etching, e.g. laser-cutting, the conductor element out of a larger piece of sheet metal. Holes may be drilled into the conductor element as well. A melting section of reduced width or comprising separate parallel running sections may be produced in this step. The thickness of partial area of the sheet metal may be reduced by rolling or pressing, in order to produce a melting section of reduced cross-section. The sheet metal may be bended easily into a final form, e.g. into a form covering the first and/or second opening of the multi-part housing. The final position of the first and second extension sections may be achieved by bending into the desired position. The sheet metal may consist of copper, bronze, brass, copper alloys, silver alloys, steel, in particular stainless steel, etc. as discussed above in the context of suitable materials for the conductor element.

In one embodiment according to the invention the electrical fuse further comprises a filling material filled in the interior space. In a further embodiment of the electrical fuse according to the invention, the filling material comprises a material having arc extinction capability. In a further embodiment of the electrical fuse according to the invention, the filling material comprises at least one of sand, silicone, glass beads and ceramic beads.

Advantageously, the interior space of the multi-part housing can be easily filled with the filling material, e.g. the arc quenching material, via the access opening of the first part, wherein the access opening can be formed widened in order to facilitate filling. After filling the interior space with the arc quenching material is completed, the first part and the second part can be slidingly engaged allowing the access opening of the first part to be covered by the second part thus proper retaining the arc quenching material in the interior space. Hence, additional sealing measures can be avoided.

Further, the scope of the invention lies in a method according to independent claim 11. According to the invention, a method of manufacturing an electrical fuse comprises the steps of:

a) providing an electrical conductor element comprising a melting section and further comprising a first extension section and a second extension section both integrally formed with the melting section and extending from both ends of the melting section in the lengthwise direction thereof, b) providing an electrically insulating, multi-part housing comprising a first part and a second part, c) introducing the conductor element into the multi-part housing thus far that the melting section is enclosed in an interior space thereof, d) slidingly engaging the first and second parts in relation to each other thus covering by the second part an access opening of the first part to the interior space.

The method may comprise an additional step of providing each of the first extension section and of the second extension section of the electrical conductor element with a terminal area. The method may comprise a further step of arranging both terminal areas outside the multi-part housing.

In one embodiment of the method according to the invention in a first aspect, step b) further comprises providing the first part with a first opening and a second opening opposite to the first opening, and step c) further comprises introducing the conductor element through said first opening and through said second opening thus far that said first and second openings being penetrated by the first and second extension sections, respectively.

In an embodiment of the method according to the invention in a second aspect, step b) further comprises providing the first part with a first opening and the second part with a second opening opposite to the first opening once the first part and the second part are engaged, and step c) further comprises introducing the conductor element through said first opening and through said second opening thus far that said first and second openings being penetrated by the first and second extension sections, respectively.

In one embodiment of the method according to the invention, the method further comprises the step of:

e) bending the first extension section and/or second extension section such to abut at least partially against outer wall sections of the multi-part housing.

In one embodiment of the method according to the invention, step d) is preceded by the step of:

filling a filling material into the interior space through the access opening.

Features of the embodiments discussed above may be combined as long as they do not contradict each other.

Figure 1B:
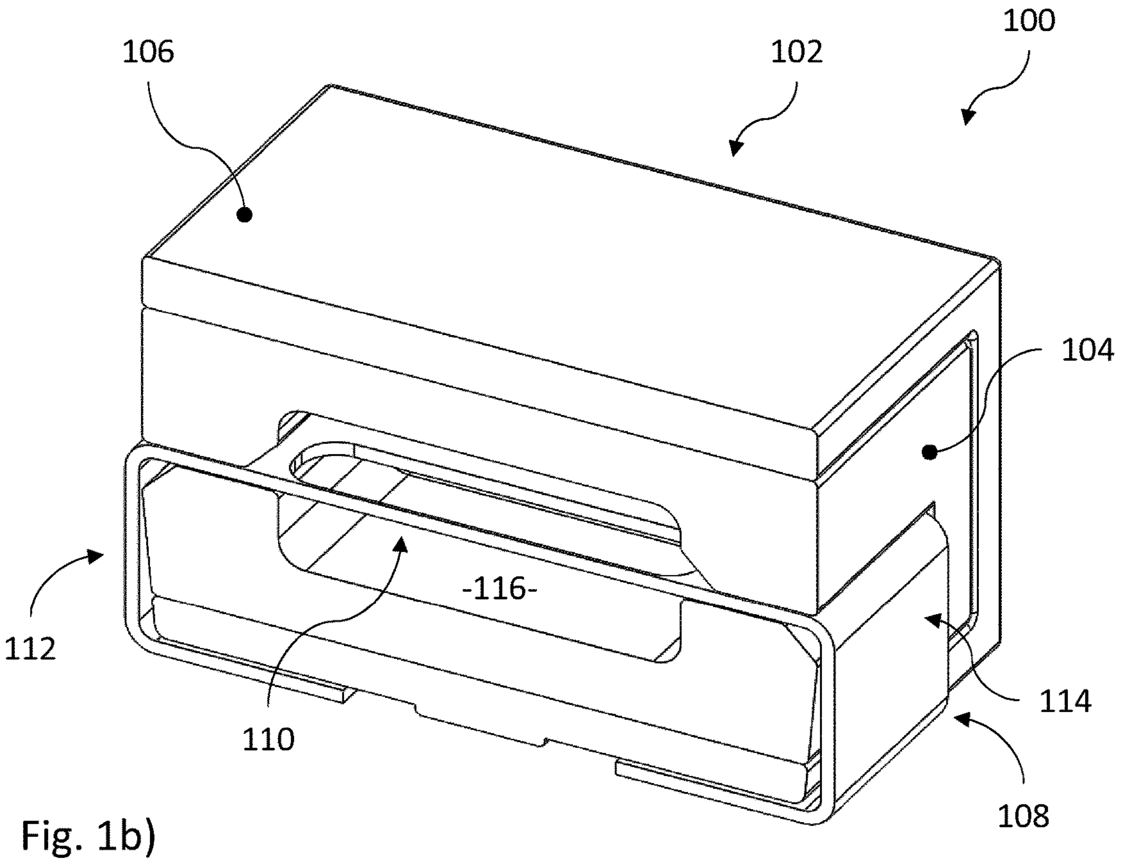
Figure 1C:
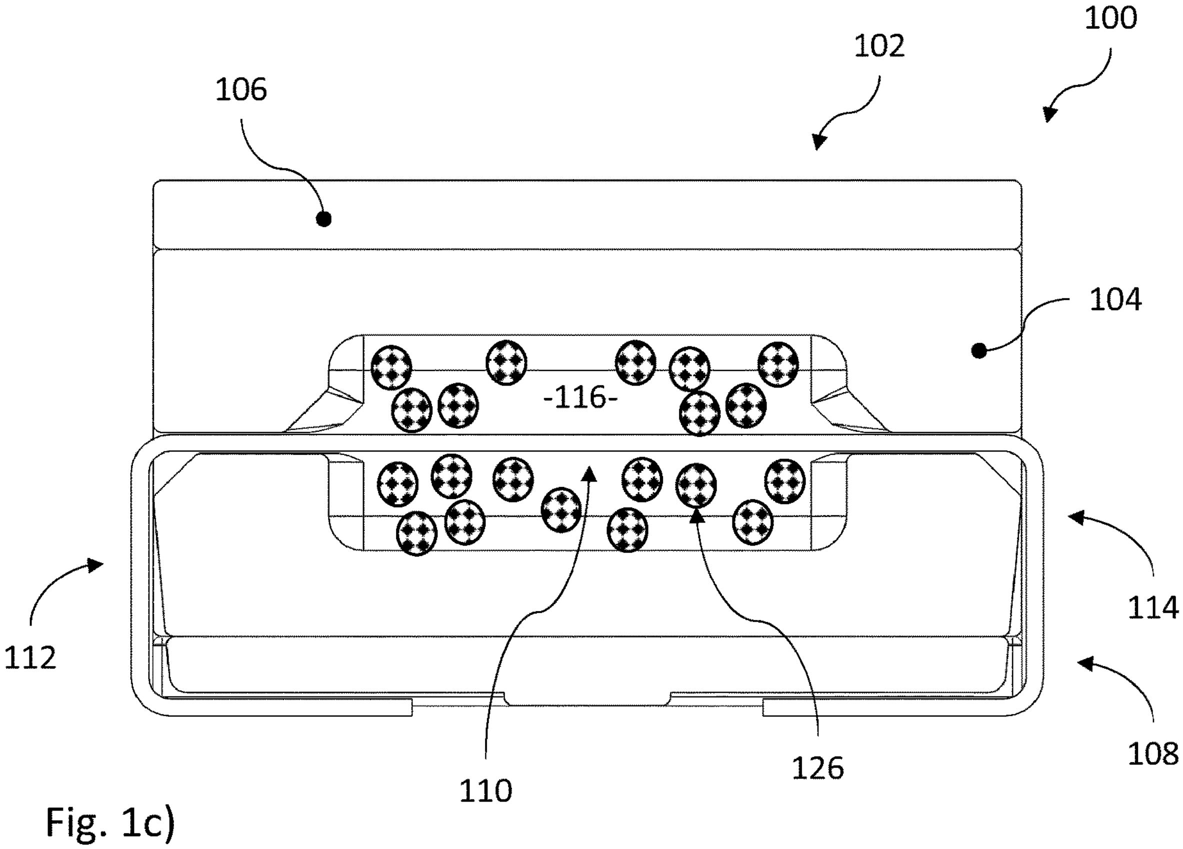
Figure 1D:
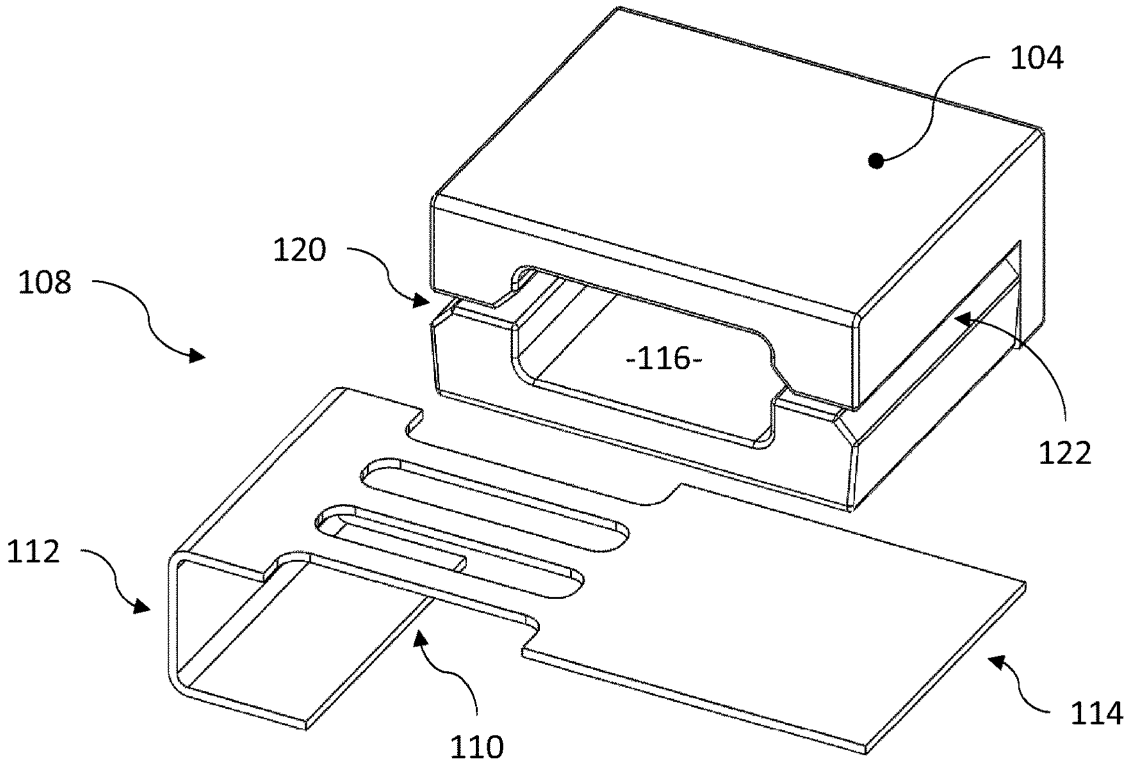
Figure 1E:
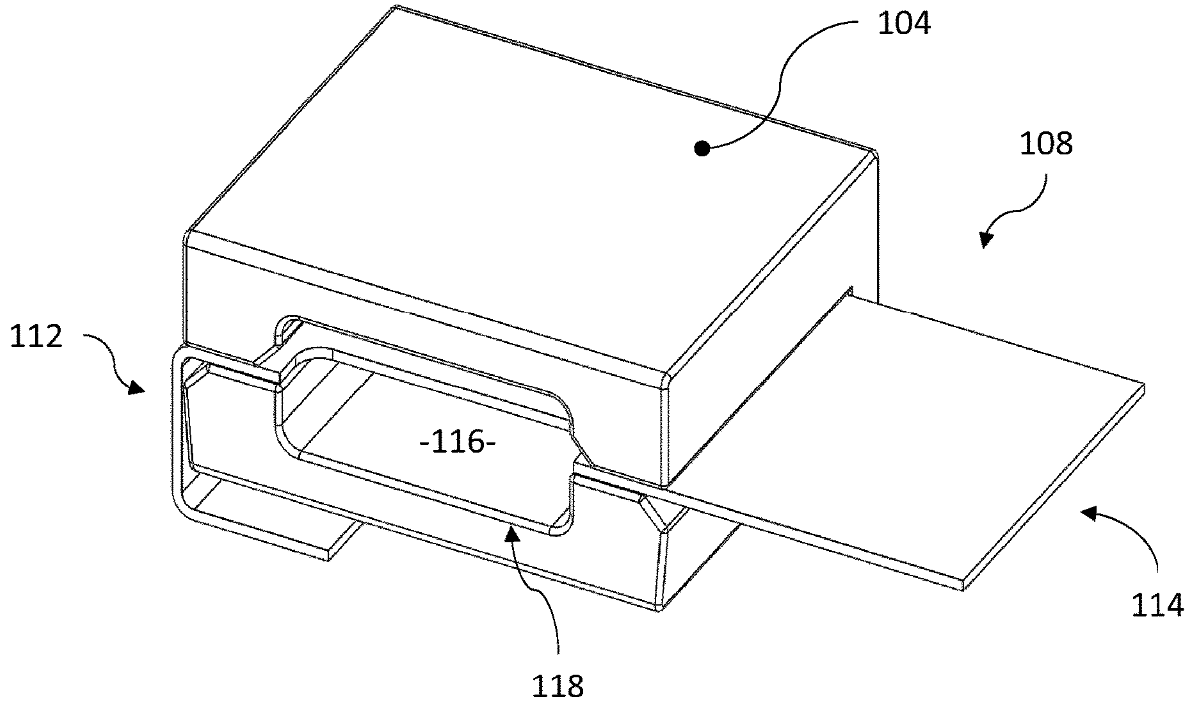
Figure 2A:
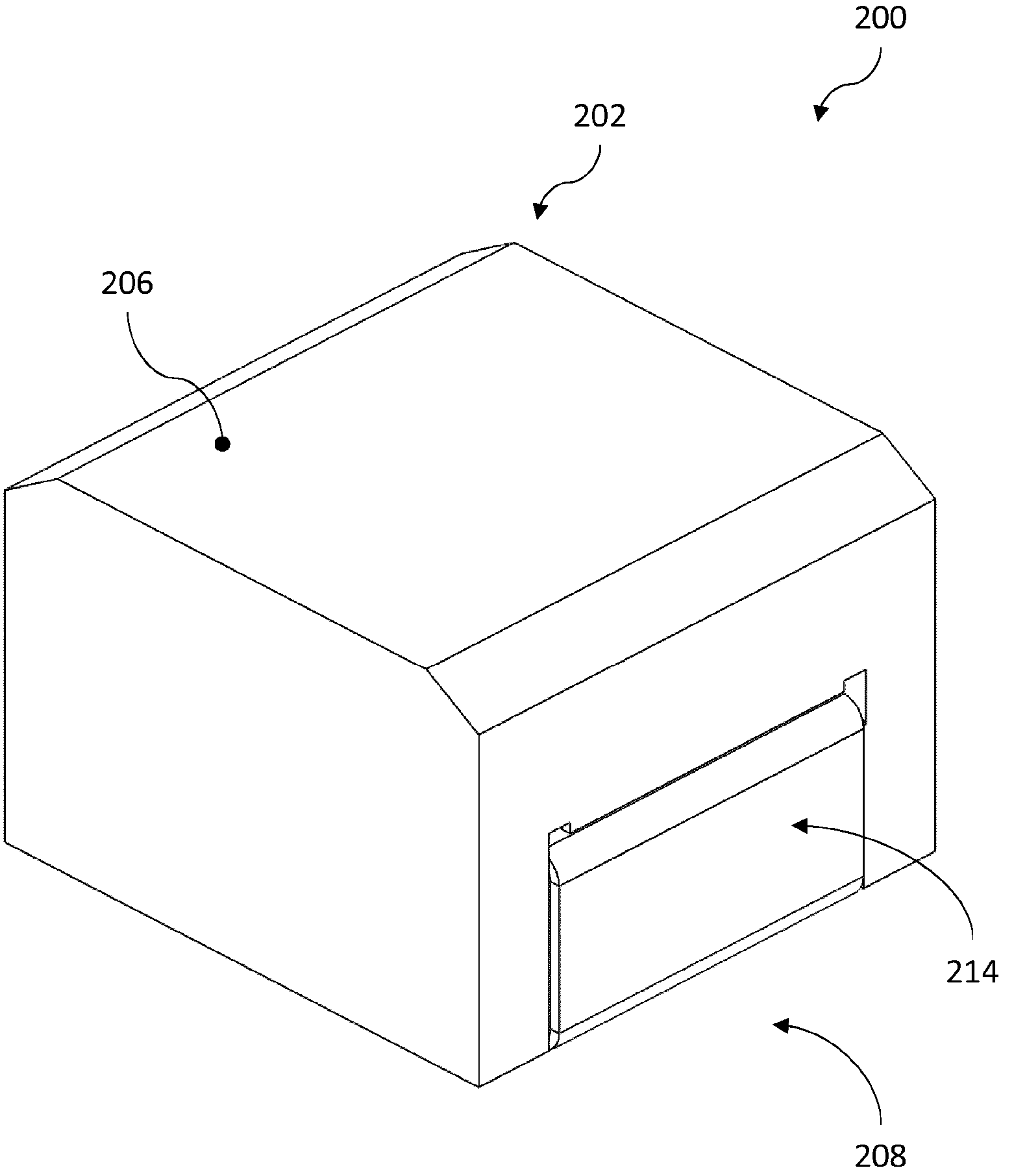
Figure 2B:
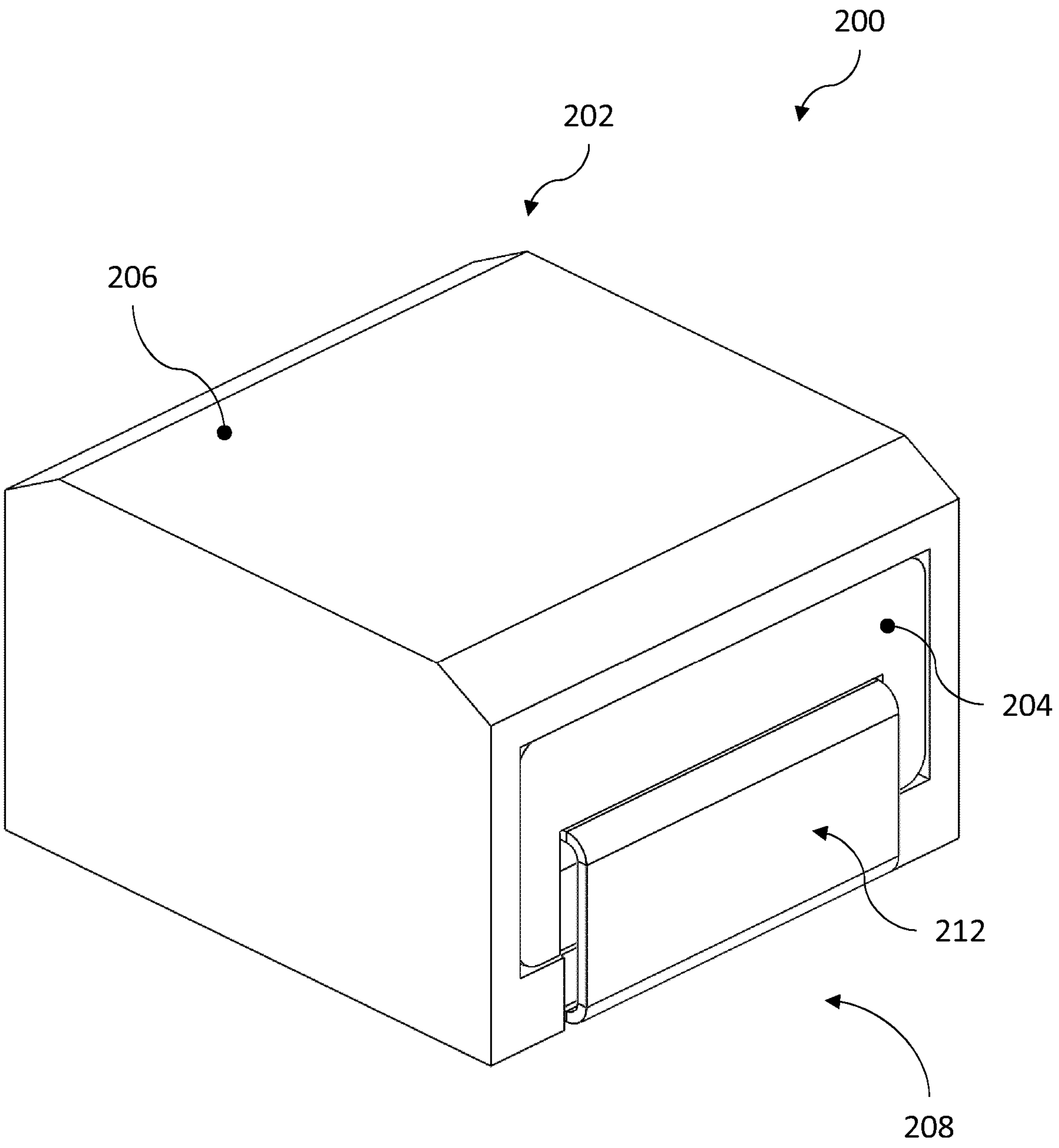
Figure 2C:
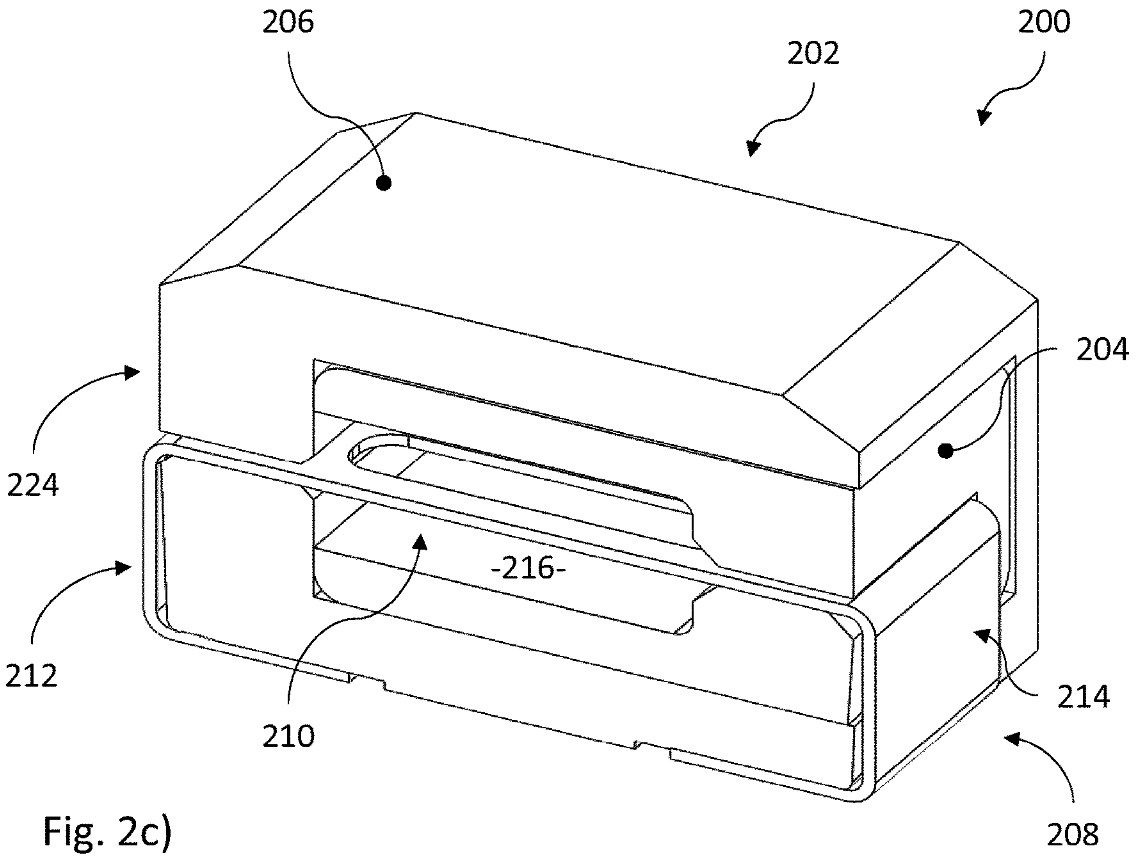
Figure 2D:
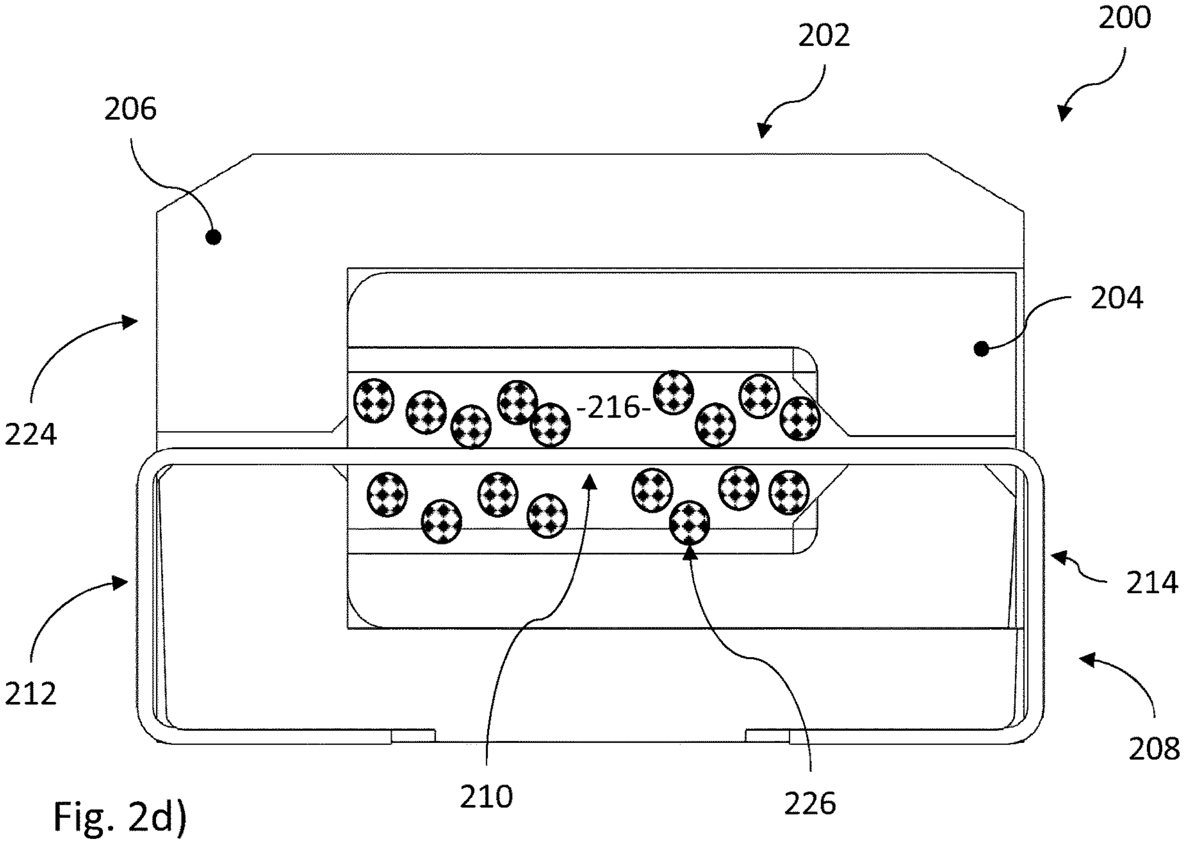
Figure 2E:
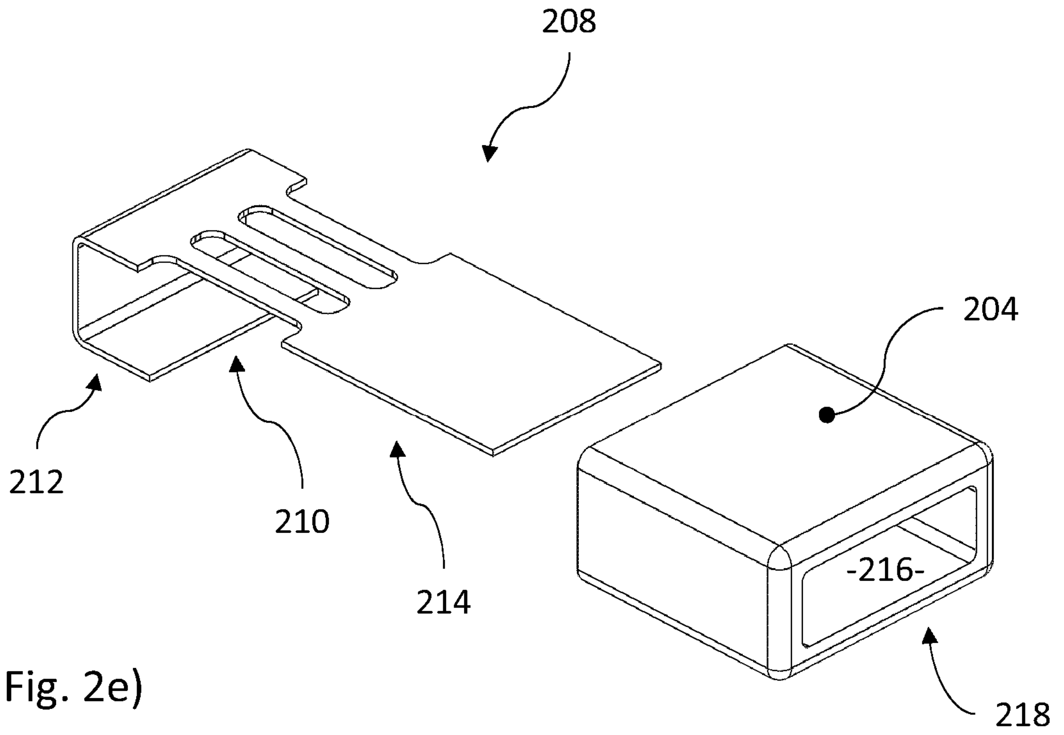
Figure 2F:
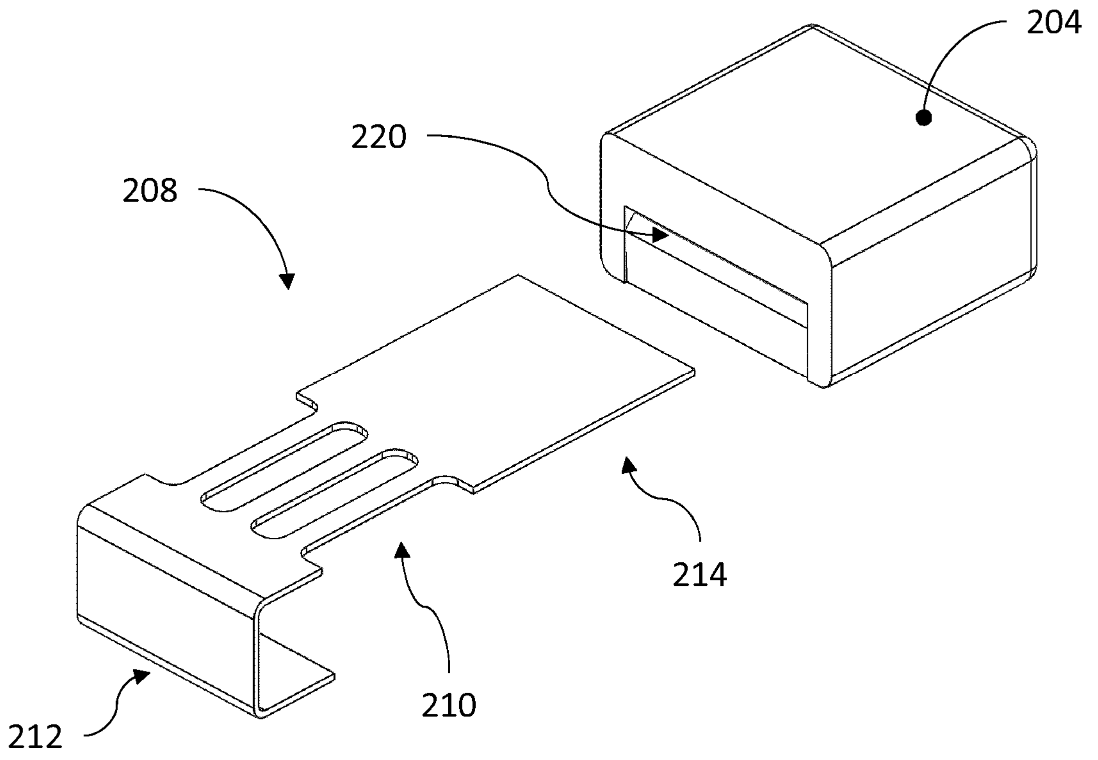
Figure 2G:
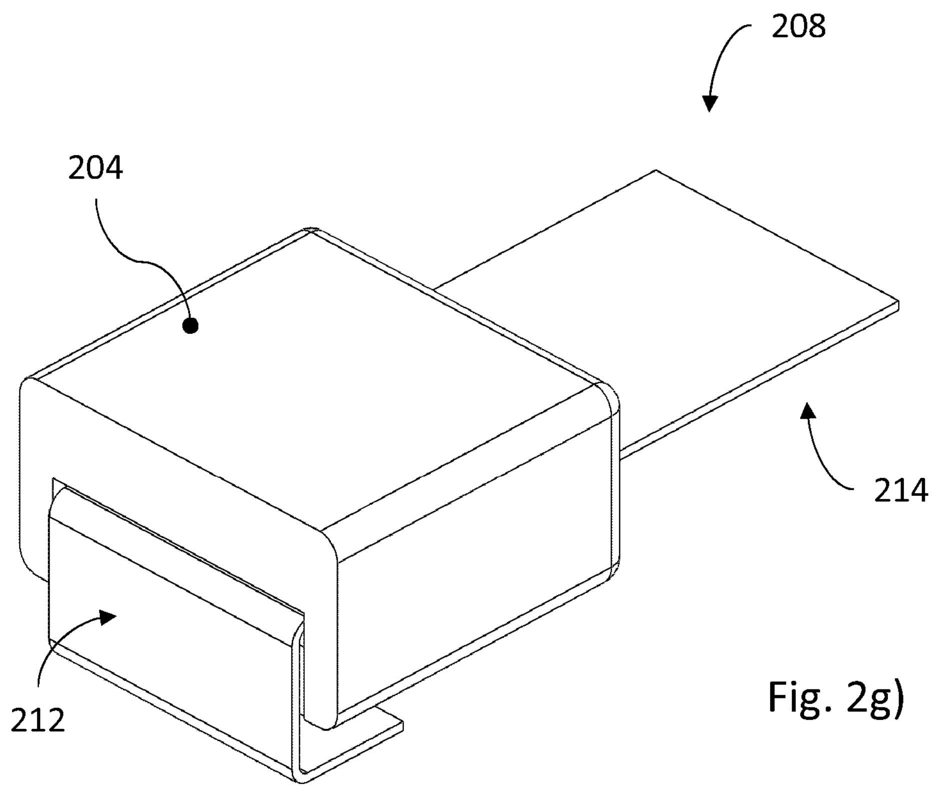
Figure 3A:
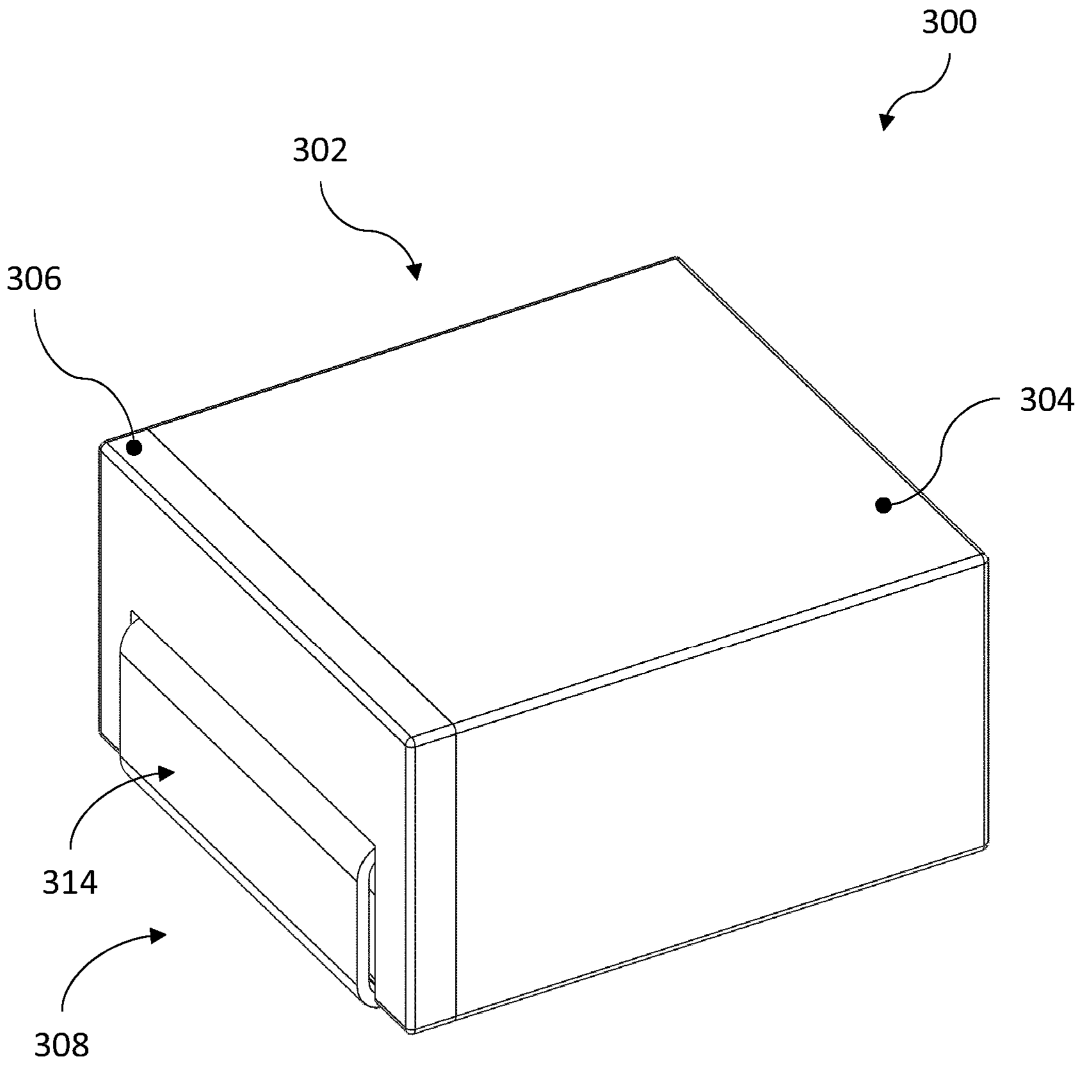
Figure 3B:
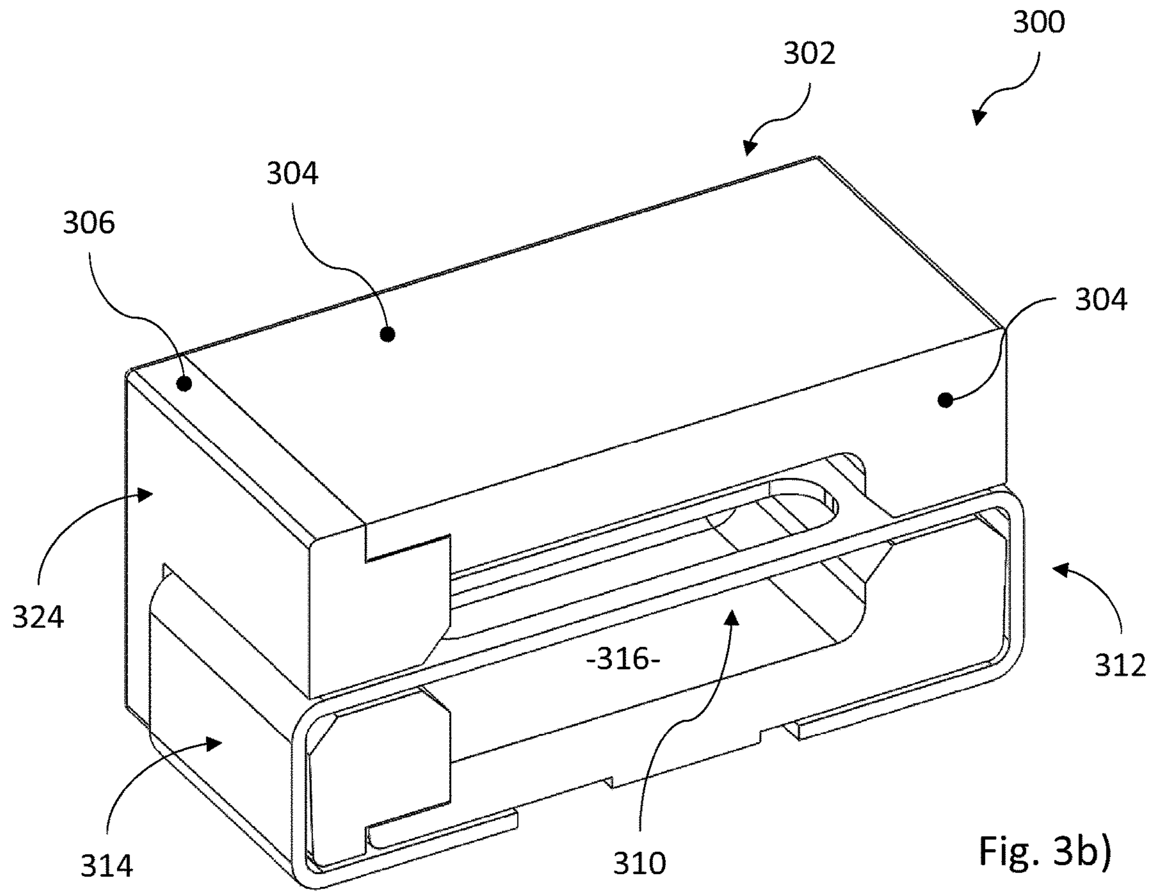
Figure 3C:
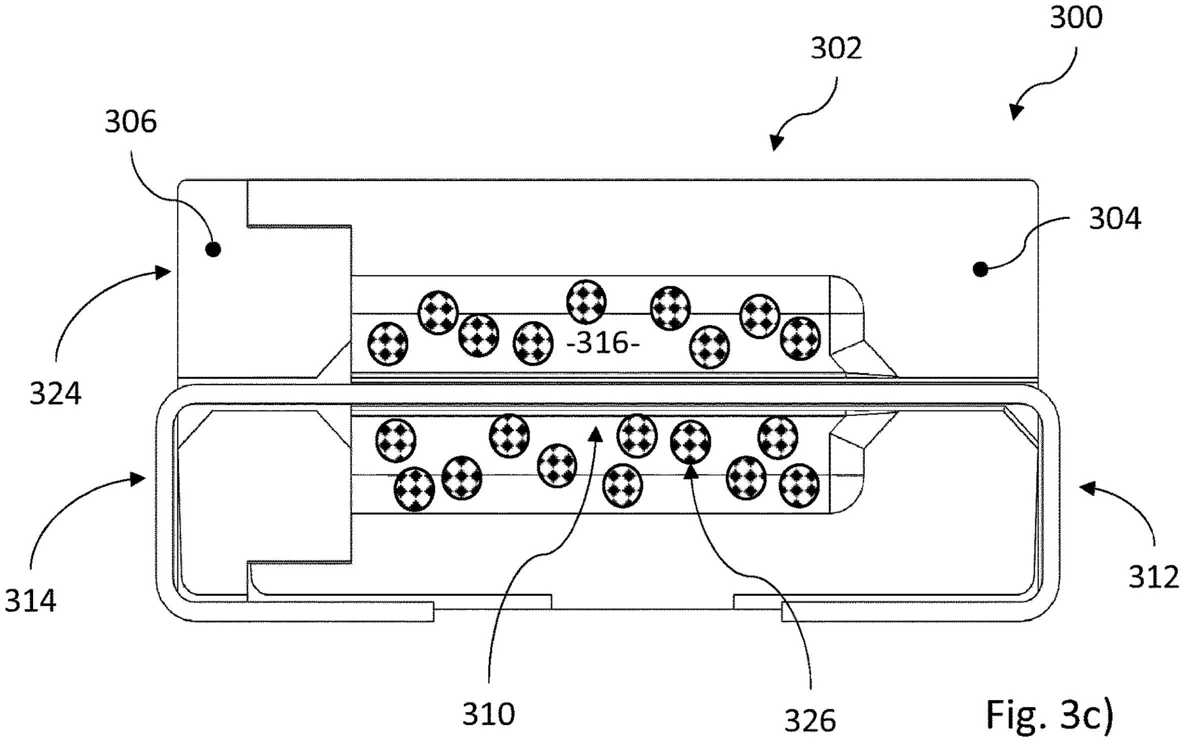
Figure 3D:
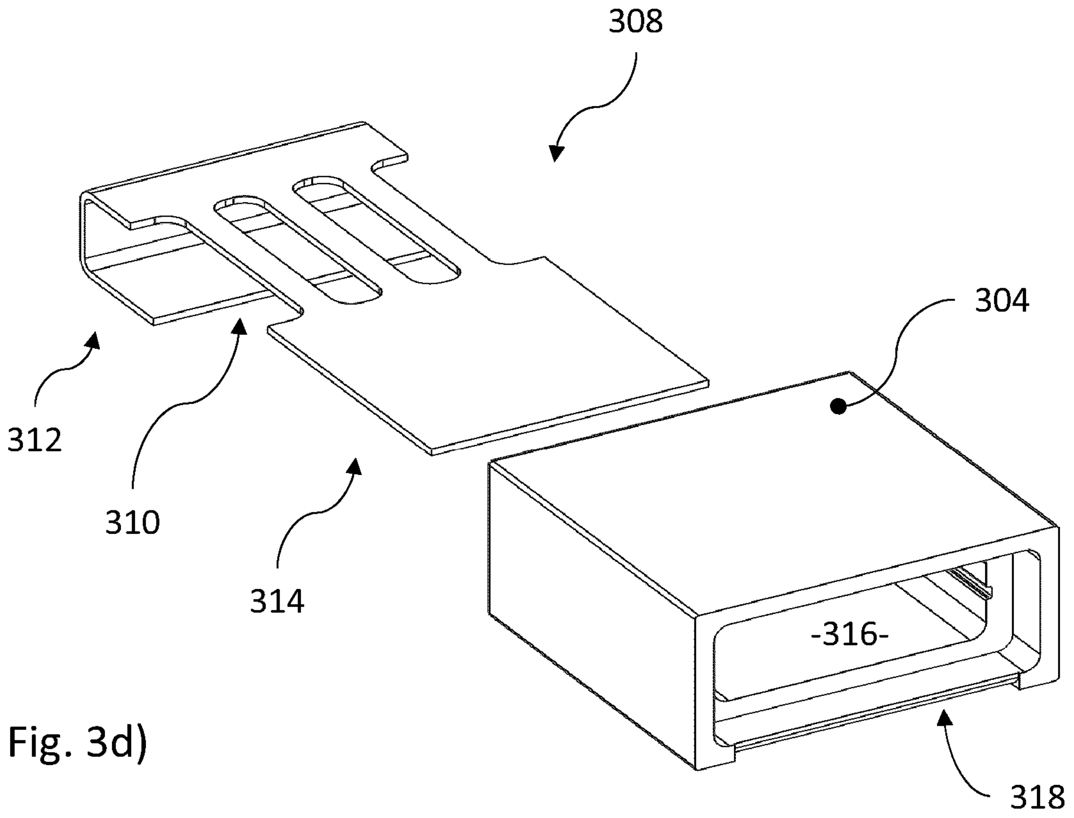
Figure 3E:
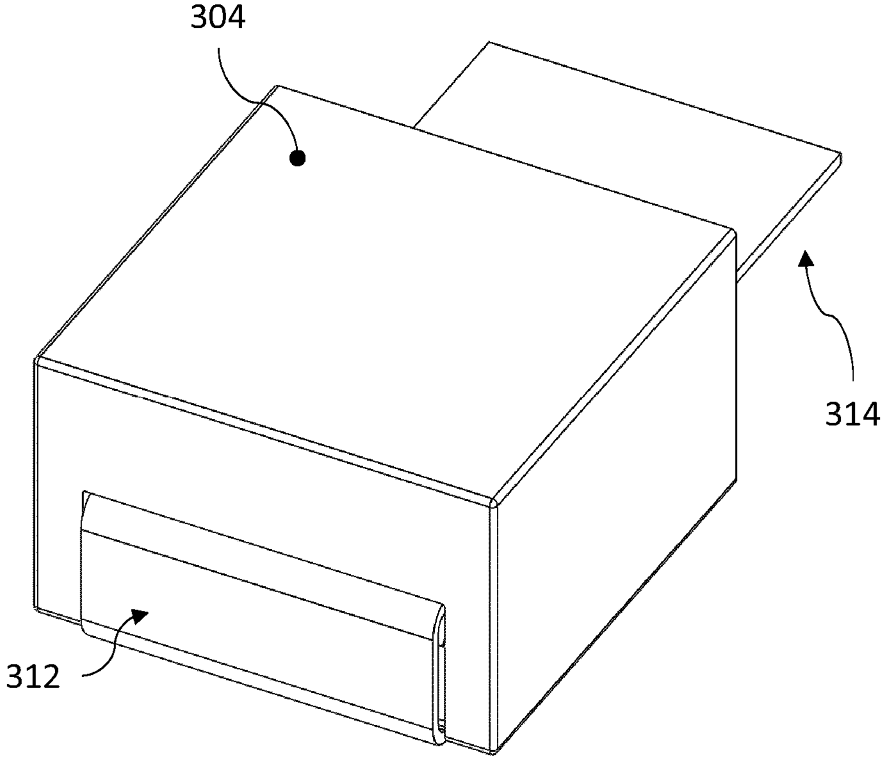
Figure 3F:
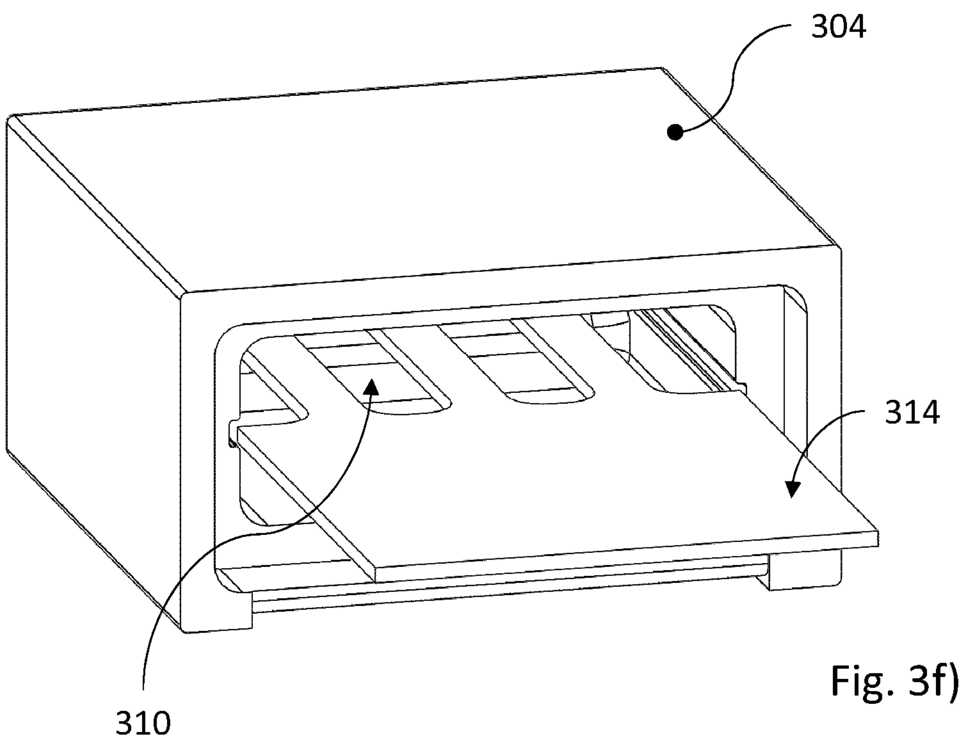
Figure 4A:
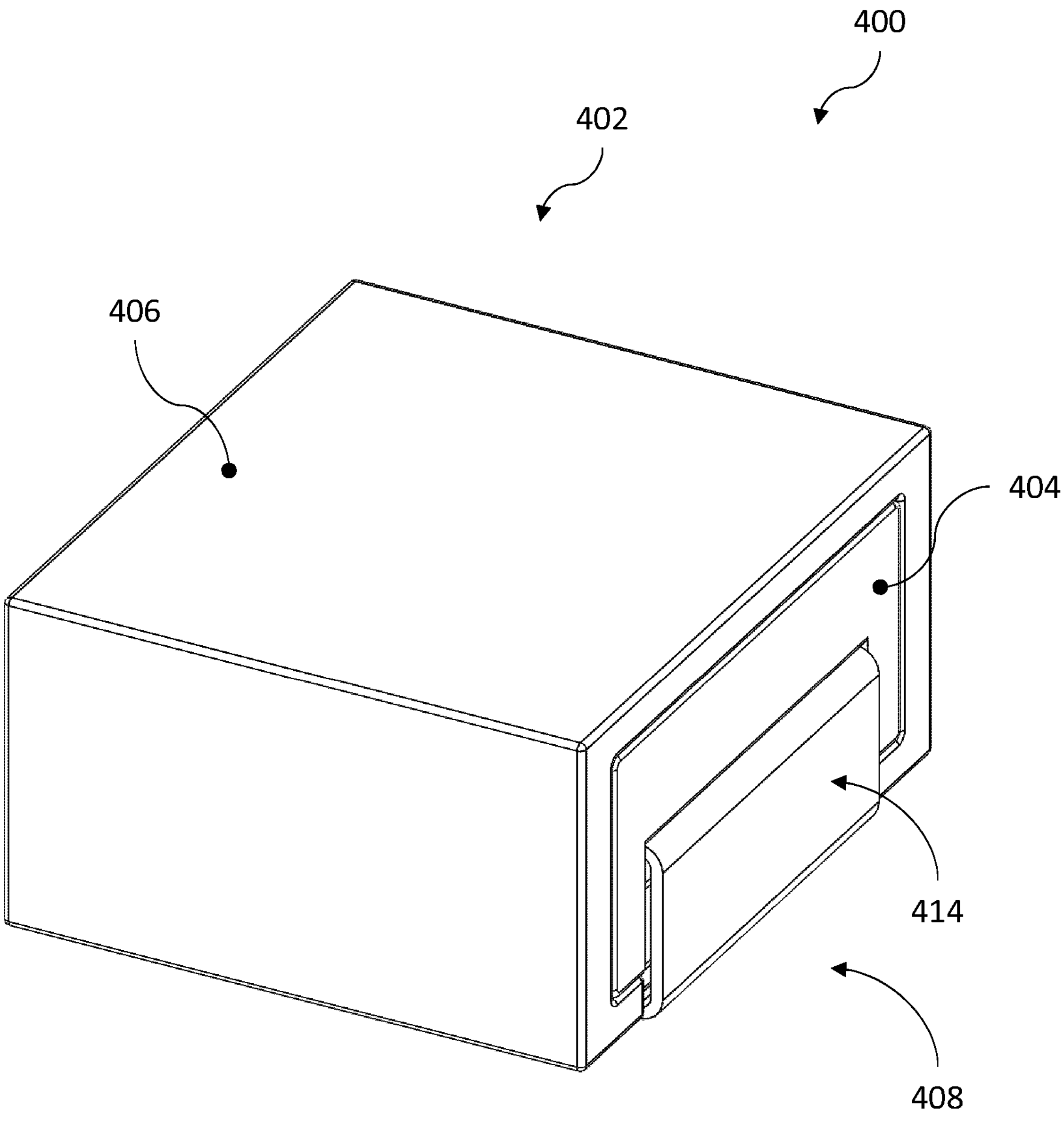
Figure 4B:
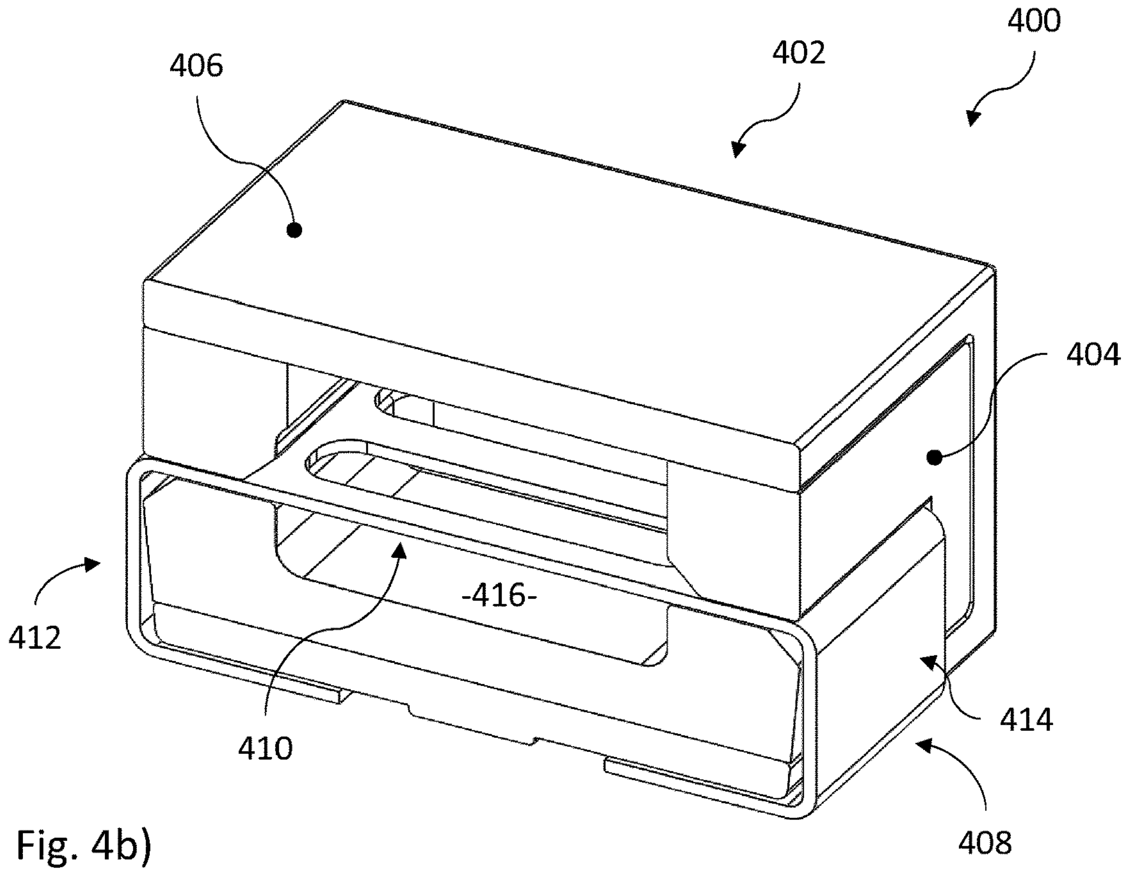
Figure 4C:
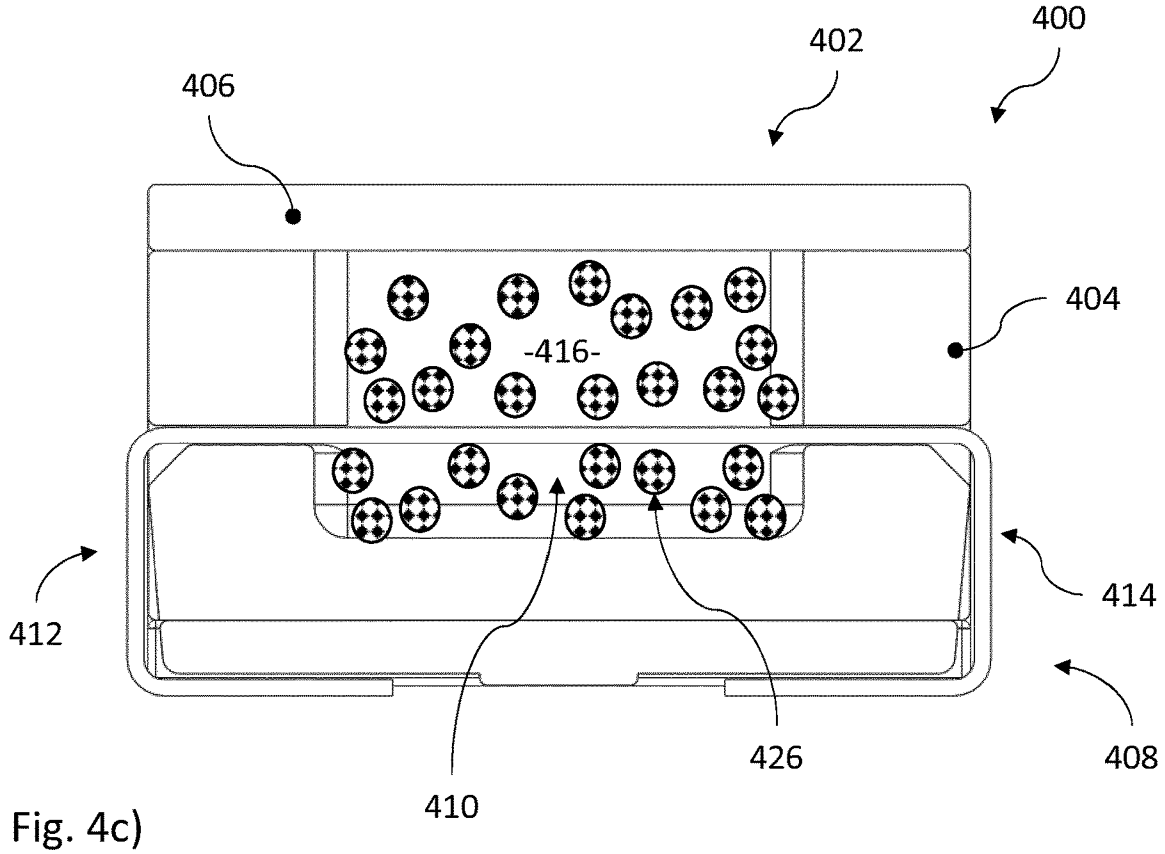
Figure 4D:
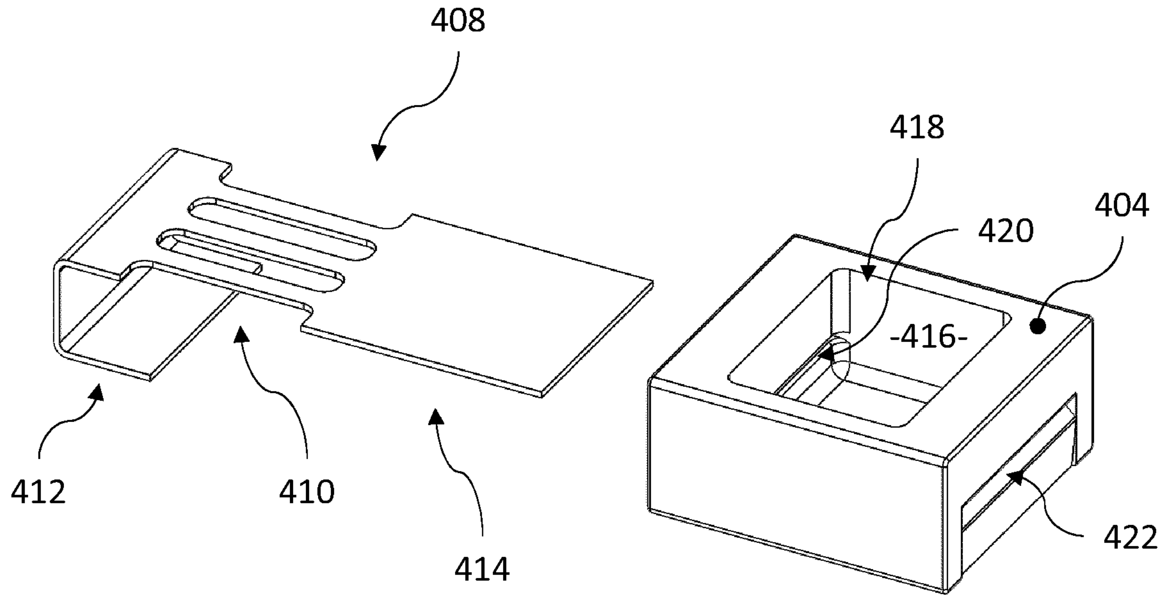
Figure 4E:
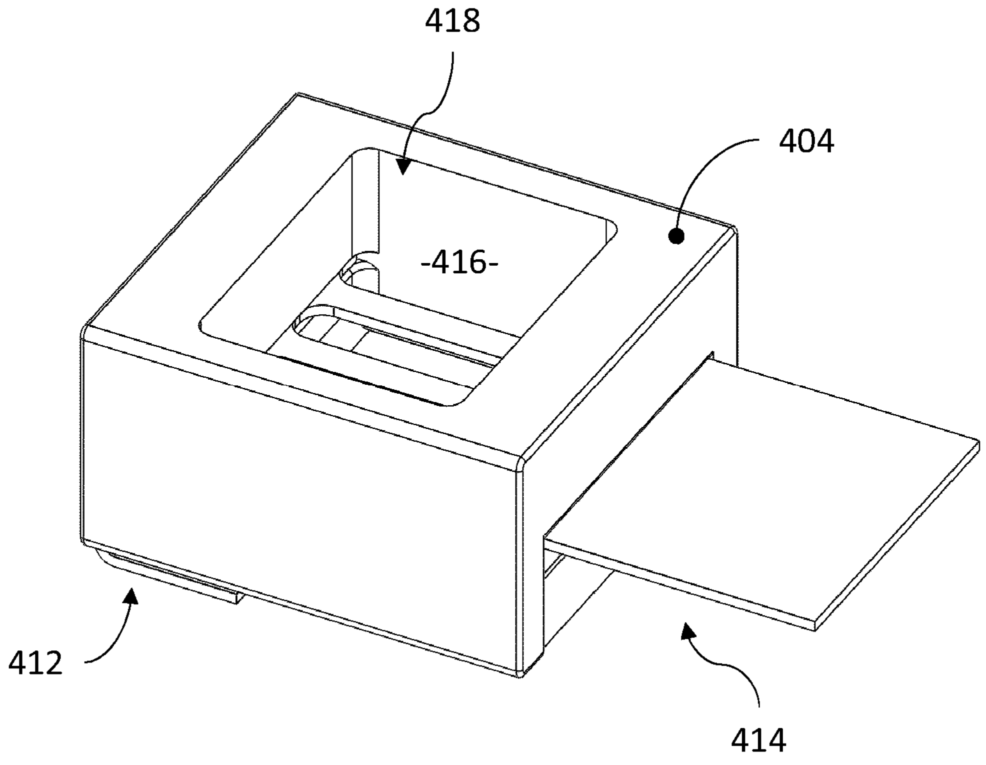
Figure 4F:
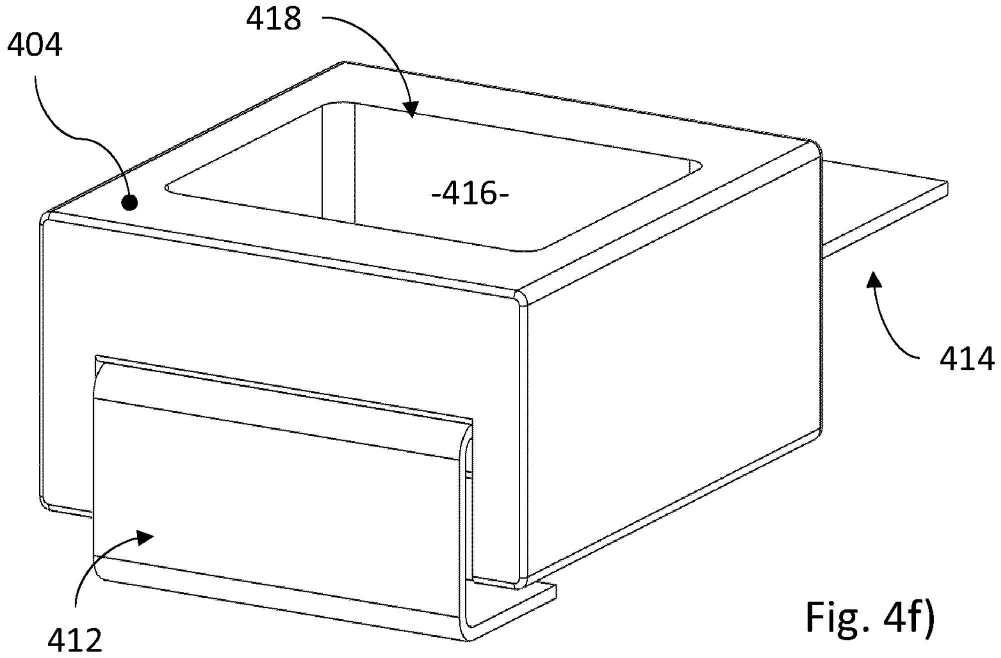
Figure 5A:
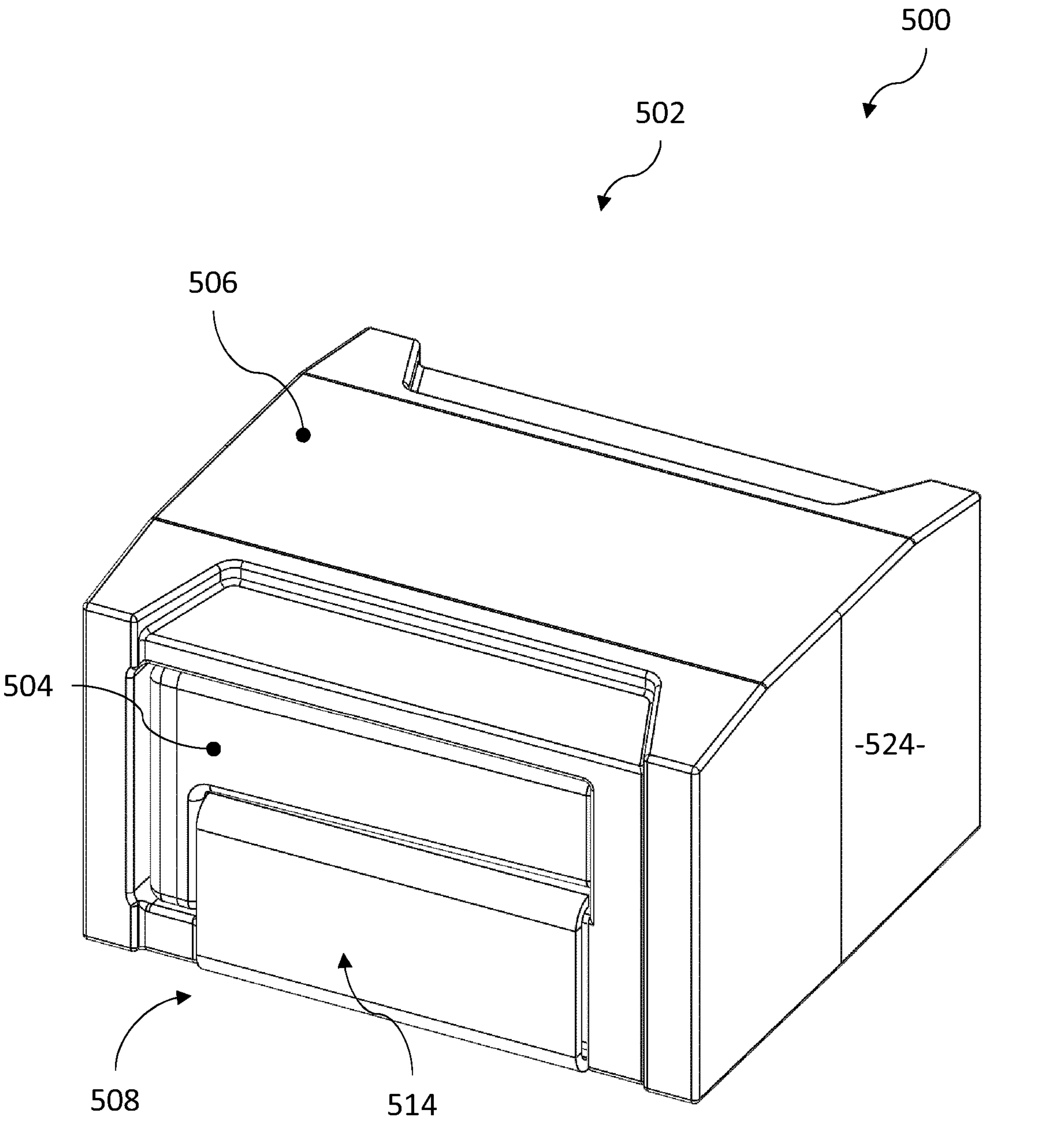
Figure 5B:
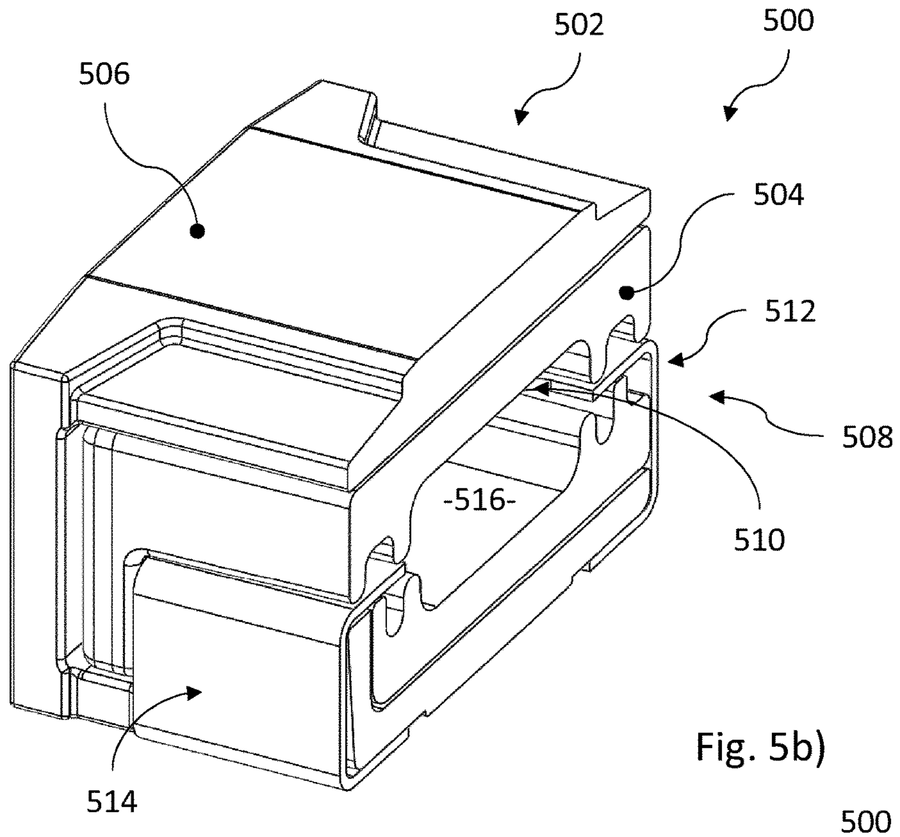
Figure 5C:
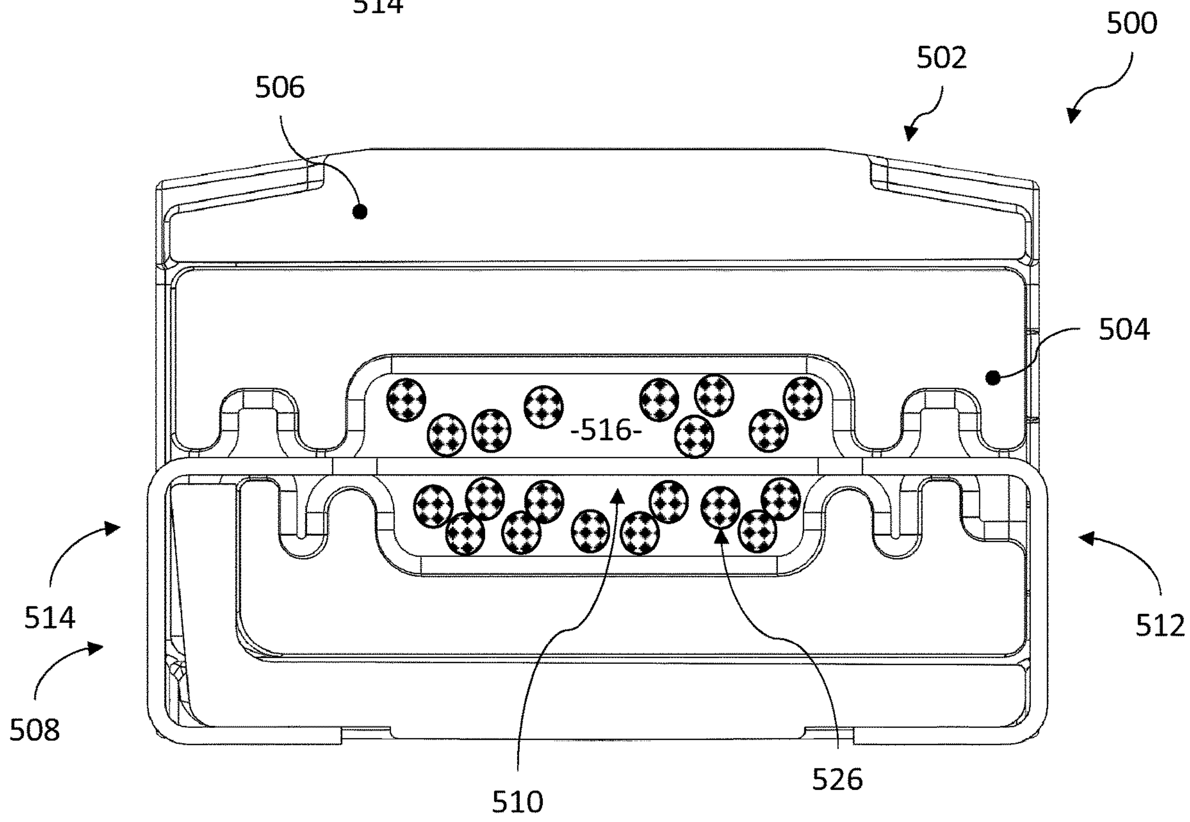
Figure 5D:
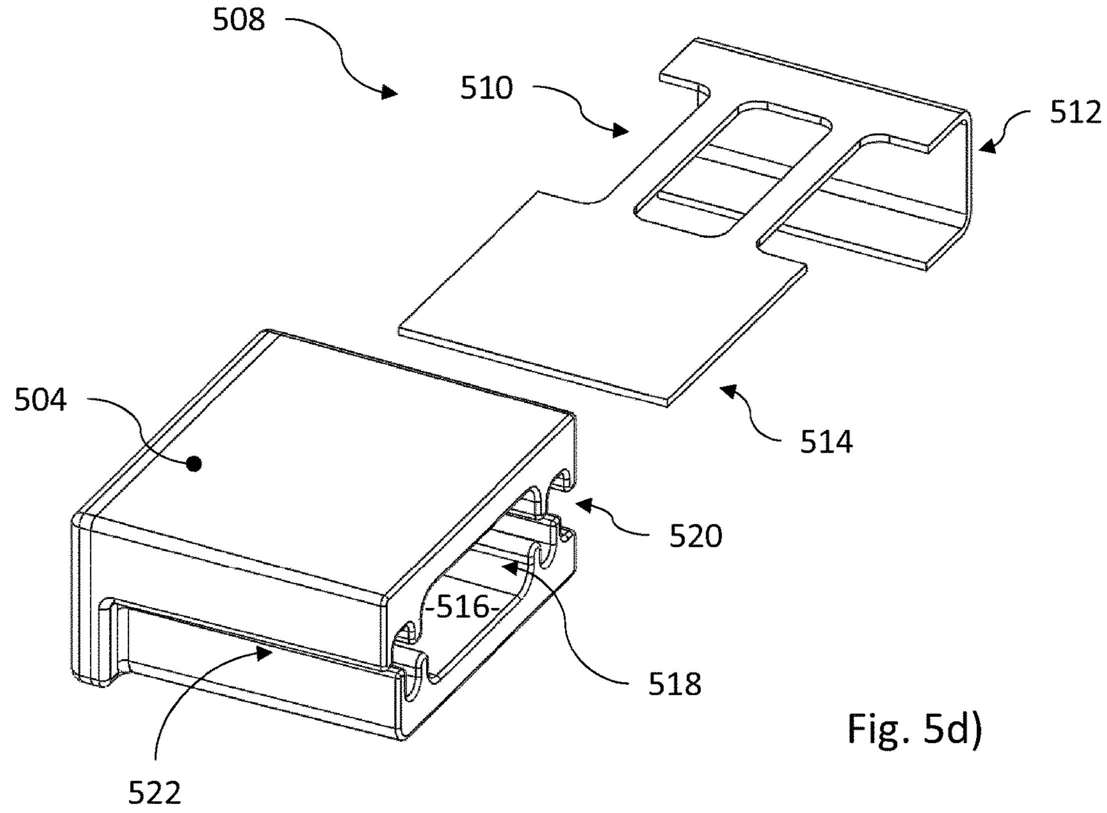
Figure 5E:
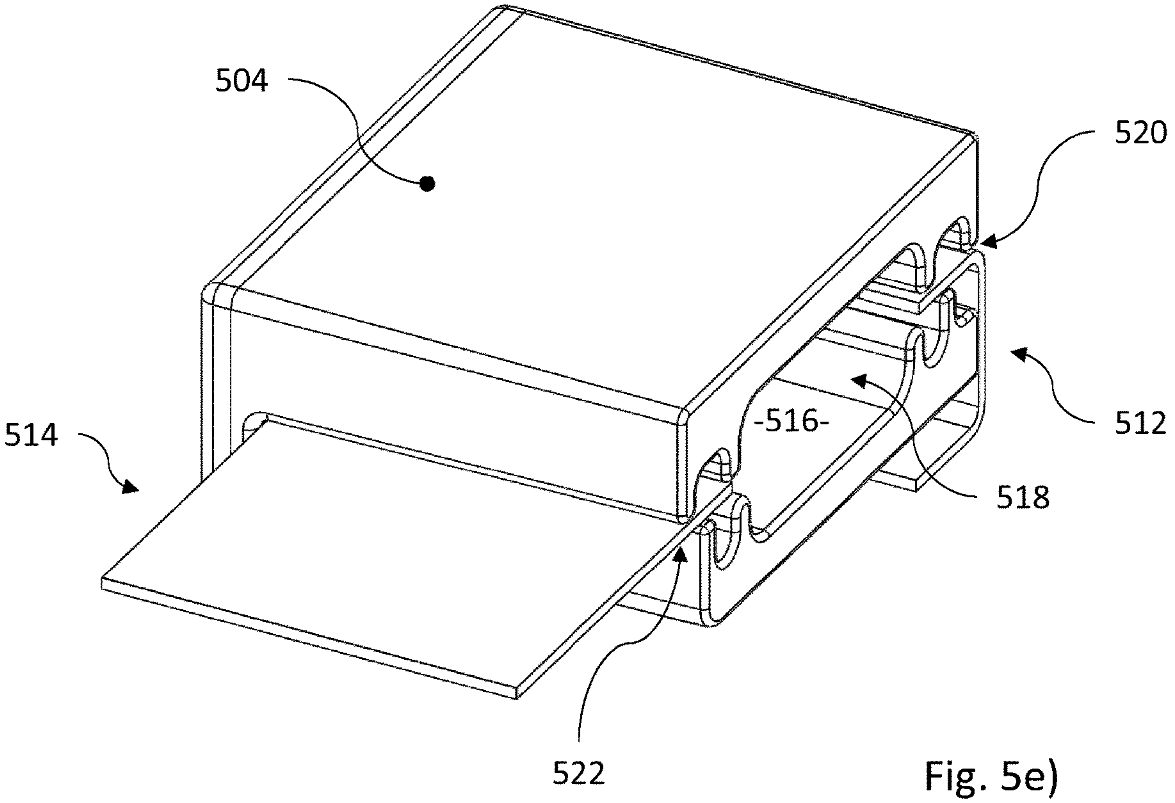

The invention shall now be further exemplified with the help of figures. The figures show:

FIGS. 1*a*) to 1*c*) different views of an electrical fuse according to the invention in a first aspect;

FIGS. 1*d*) to 1*i*) different states during manufacturing the electrical fuse according to the invention in the first aspect;

FIGS. 2*a*) to 2*d*) different views of an electrical fuse according to the invention in a second aspect;

FIGS. 2*e*) to 2*j*) different states during manufacturing the electrical fuse according to the invention in the second aspect;

FIGS. 3*a*) to 3*c*) different views of an electrical fuse according to the invention in a third aspect;

FIGS. 3*d*) to 3*i*) different states during manufacturing the electrical fuse according to the invention in the third aspect;

FIGS. 4*a*) to 4*c*) different views of an electrical fuse according to the invention in a fourth aspect;

FIGS. 4*d*) to 4*i*) different states during manufacturing the electrical fuse according to the invention in the fourth aspect;

FIGS. 5*a*) to 5*c*) different views of an electrical fuse according to the invention in a fifth aspect; and FIGS. 5*d*) to 5*h*) different states during manufacturing the electrical fuse according to the invention in the fifth aspect.

FIGS. 1*a*) to 1*c*) show different views of an electrical fuse 100 according to the invention in a first aspect, while FIGS. 1*d*) to 1*i*) show different states during manufacturing the electrical fuse 100 in the first aspect.

The electrical fuse 100 comprises an electrically insulating, multi-part housing 102 comprising a first part 104 and a second part 106. In the assembled state, the first part 104 and second part 106 are slidingly engaged to each other to be explained in further detail in the following.

The electrical fuse 100 further comprises an electrical conductor element 108. In the shown aspect, the electrical conductor element 108 comprises a sheet metal. The electrical conductor element 108 comprises a melting section 110, a first extension section 112 and a second extension section 114, all sections integrally formed. The first extension section 112 and second extension section 114, respectively, extend from both ends of the melting section 110 in the lengthwise direction. The melting section 110 of the electrical conductor element 108 can be formed of e.g. parallel strips with reduced width as compared to the widths of the first extension section 112 and second extension section 114.

In the assembled state, the multi-part housing 102 encloses the melting section 110 in an interior space 116 of the multi-part housing 102. The first part 104 comprises an access opening 118 allowing access to the interior space 116. In the assembled state, the first part 104 and second part 106 are engaged or rather arranged such that the second part 106 covers the access opening 118 of the first part 104 to the interior space 116.

The first part 104 further comprises a first opening 120 and a second opening 122 opposite to the first opening 120. Said first opening 120 and second opening 122 being penetrated by the first extension section 112 and second extension section 114, respectively. A (lateral) wall 124 comprised by the second part 106 covers the access opening 118 of the first part 104.

In assembling the electrical fuse 100, the electrical conductor element 108 is mounted to the first part 104 by laterally guiding the first extension section 112 and second extension section 114 of the conductor element 108 via the first opening 120 and second opening 122 of the first part 104 such that the melting section 110 of the electrical conductor element 108 is enclosed or rather resides in the interior space 116 (refer to FIGS. 1*d*) and 1*e*)). The first extension section 112 can be pre-bended.

Figure 1F:
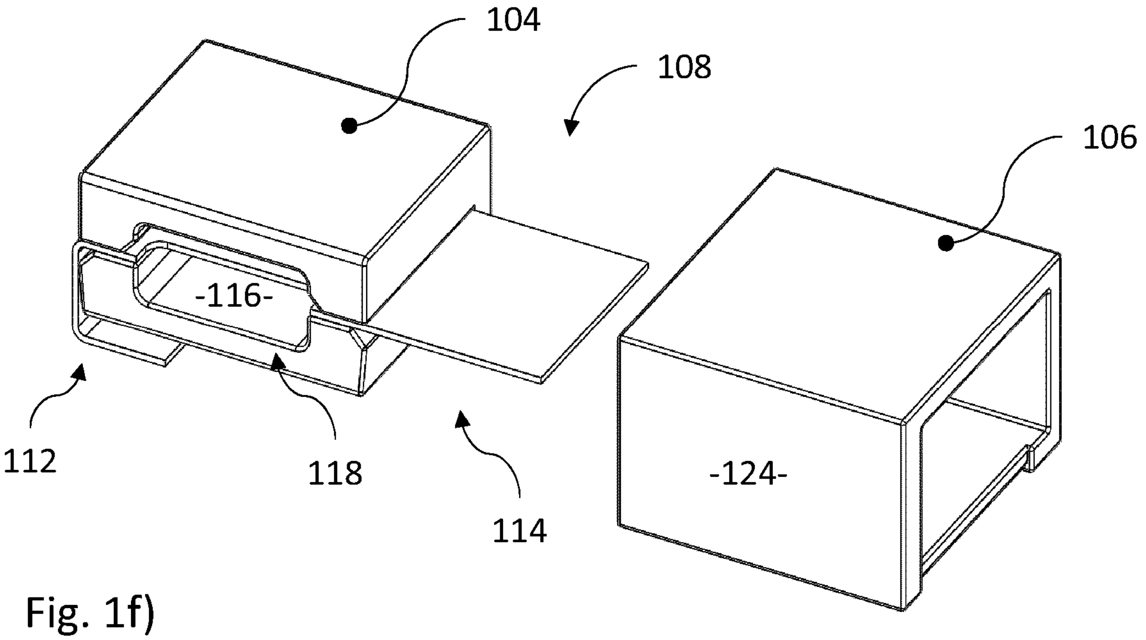
Figure 1G:
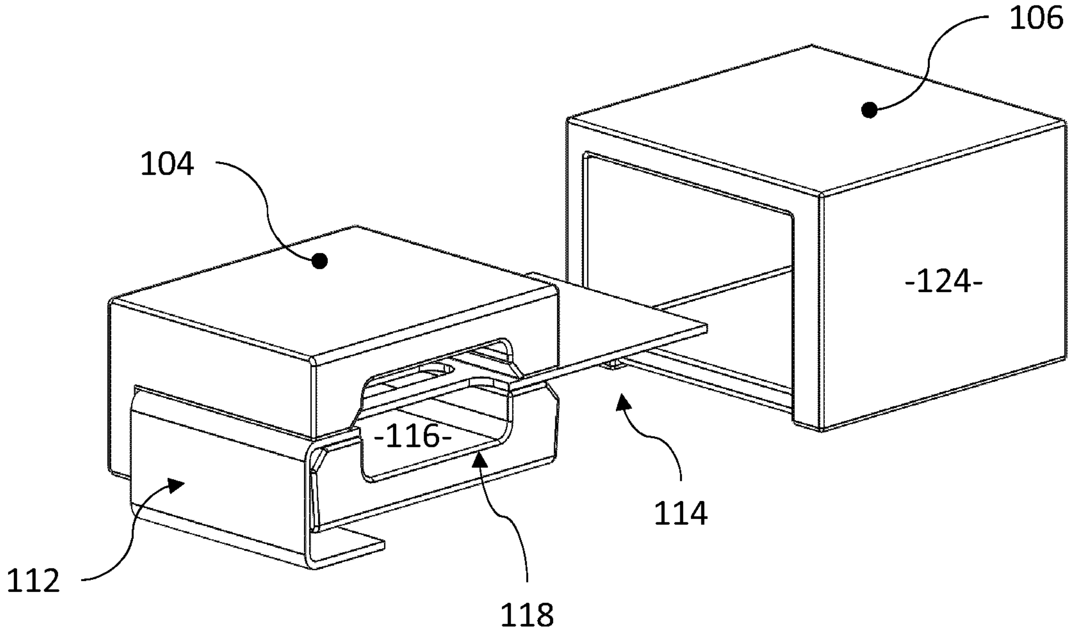
Figure 1H:
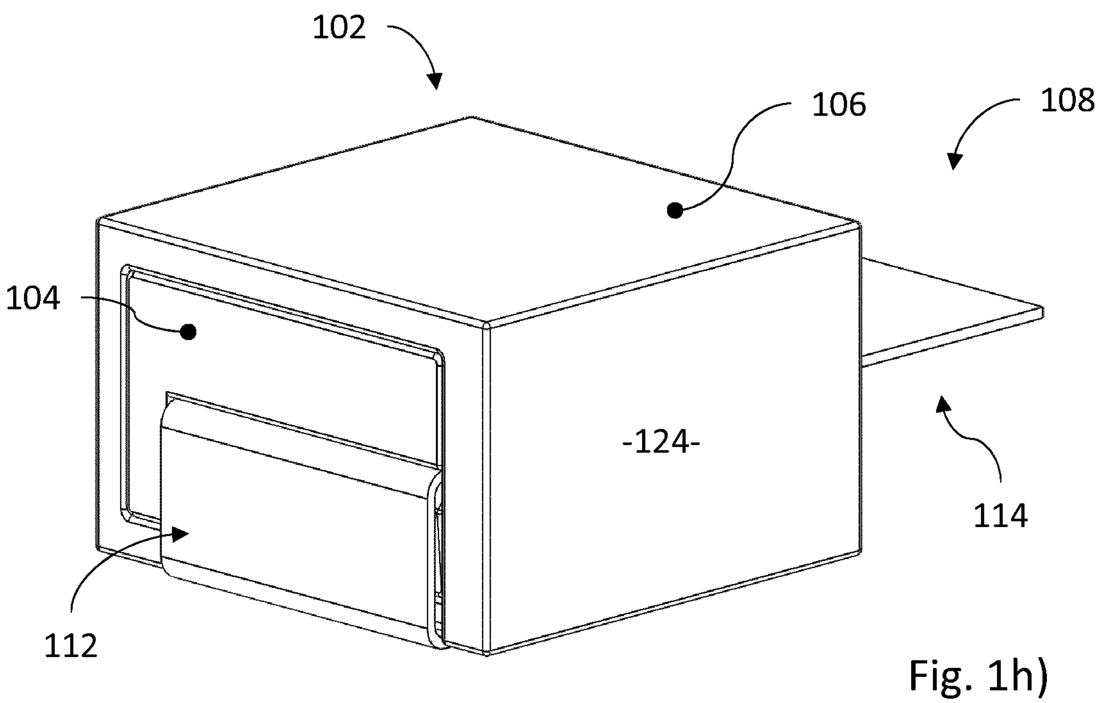
Figure 1I:
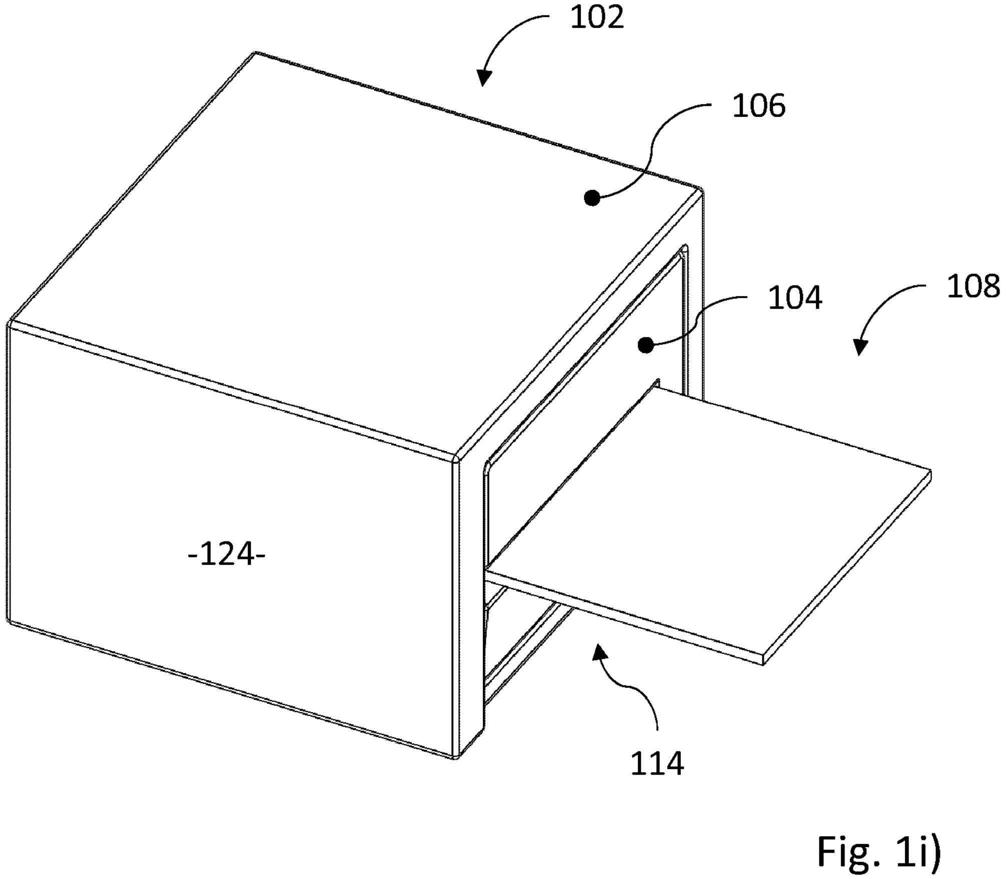

In a next step, the first part 104 (equipped with the electrical conductor element 108) and the second part 106 are slidingly engaged with each other (refer to FIGS. 1*f*) and 1*g*)). In the engaged state, the (lateral) wall 124 comprised by the second part 106 covers the access opening 118 of the first part 104 (refer to FIGS. 1*h*) and 1*i*)). Hence, the melting section 110 of the electrical conductor element 108 is placed in the interior space 116 of the multi-part housing 102 while properly sealed against the exterior thereof. In a next step, the second extension section 114, in at least a portion thereof, can be bended. Said bending can e.g. performed such to engage an outer surface portion of the second part 106, thus properly attaching or rather arresting the first part 104 and second part 106 to each other. In the shown aspect, a portion of the second extension section 114 is bended such to correspond to the pre-bended portion of the first extension section 112 (refer to FIGS. 1*b*) and 1*c*)).

In the shown aspect, the cross-section of the first extension section 112 of the electrical conductor element 108 corresponds in form and dimension to the cross-section of the first opening 120. Further, the cross-section of the second extension section 114 of the electrical conductor element 108 corresponds in form and dimension to the cross-section of the second opening 122.

In the thus assembled state, the first extension section 112 comprised by the electrical conductor element 108 seals the first opening 120 of the first part 104, and the second extension section 114 comprised by the electrical conductor element 108 seals the second opening 122 of the first part 104.

The walls of the multi-part housing 102, the first extension section 112 of the electrical conductor element 108 and the second extension section 114 of the electrical conductor element 108 together form a dust-tight multi-part housing 102. Gaps between the multi-part housing 102 and the first extension section 112 and second extension section 114 of the electrical conductor element 108 can be dimensioned small enough that no dust can pass across the gaps. This prevents on the one hand dust particles from entering into the multi-part housing 102 from outside the electrical fuse 100 and on the other hand protects the surrounding of the electrical fuse 100 from particles produced as consequence of blowing the electrical conductor element 108. Consequently, the interior space 116 of the multi-part housing 102 can be properly sealed, while the first part 104 and second part 106 can be properly attached to each other without further connecting means.

Subsequently to the step of mounting the electrical conductor element 108 to the first part 104, the interior space 116 can be filled with a filling material 126 comprising e.g. an arc quenching material, as schematically depicted in FIG. 1*c*). Advantageously, the access opening 118 is formed widened such to easily allow filling the interior space 116 with the filling material 126. Once the first part 104 and second part 106 of the multi-part housing 102 are engaged, the wall 124 comprised by the second part 106 properly covers or rather seals the access opening 118 against the exterior such to reliably retain the filling material 126 inside the interior space 116.

FIGS. 2*a*) to 2*d*) show different views of an electrical fuse 200 according to the invention in a second aspect, while FIGS. 2*e*) to 2*j*) show different states during manufacturing the electrical fuse 200 according to the invention in the second aspect.

The electrical fuse 200 comprises an electrically insulating, multi-part housing 202 comprising a first part 204 and a second part 206. In the assembled state, the first part 204 and second part 206 are slidingly engaged to each other to be explained in further detail in the following.

The electrical fuse 200 further comprises an electrical conductor element 208. In the shown aspect, the electrical conductor element 208 comprises a sheet metal. The electrical conductor element 208 comprises a melting section 210, a first extension section 212 and a second extension section 214, all sections integrally formed. The first extension section 212 and second extension section 214, respectively, extend from both ends of the melting section 210 in the lengthwise direction. The melting section 210 of the electrical conductor element 208 can be formed of e.g. parallel strips with reduced width as compared to the widths of the first extension section 212 and second extension section 214.

In the assembled state, the multi-part housing 202 encloses the melting section 210 in an interior space 216 of the multi-part housing 202. The first part 204 comprises a (front) access opening 218 allowing access to the interior space 216. In the assembled state, the first part 204 and second part 206 are engaged or rather arranged such that the second part 206 covers the access opening 218 of the first part 204 to the interior space 216.

The first part 204 comprises a first opening 220 and the second part 206 comprises a second opening 222 opposite to the first opening 220 of the first part 204. Said first opening 220 and second opening 222 being penetrated by the first extension section 212 and second extension section 214, respectively. A (back) wall 224 comprised by the second part 206 covers the access opening 218 of the first part 204.

In assembling the electrical fuse 200, the electrical conductor element 208 is mounted to the first part 204 by guiding the first extension section 212 and second extension section 214 via the first opening 220 of the first part 204 (in the lengthwise direction thereof) such that the melting section 210 of the electrical conductor element 208 resides in the interior space 216 (refer to e.g. FIGS. 2*e*), 2*f*) and 2*i*)). The first extension section 212 can be pre-bended.

Figure 2H:
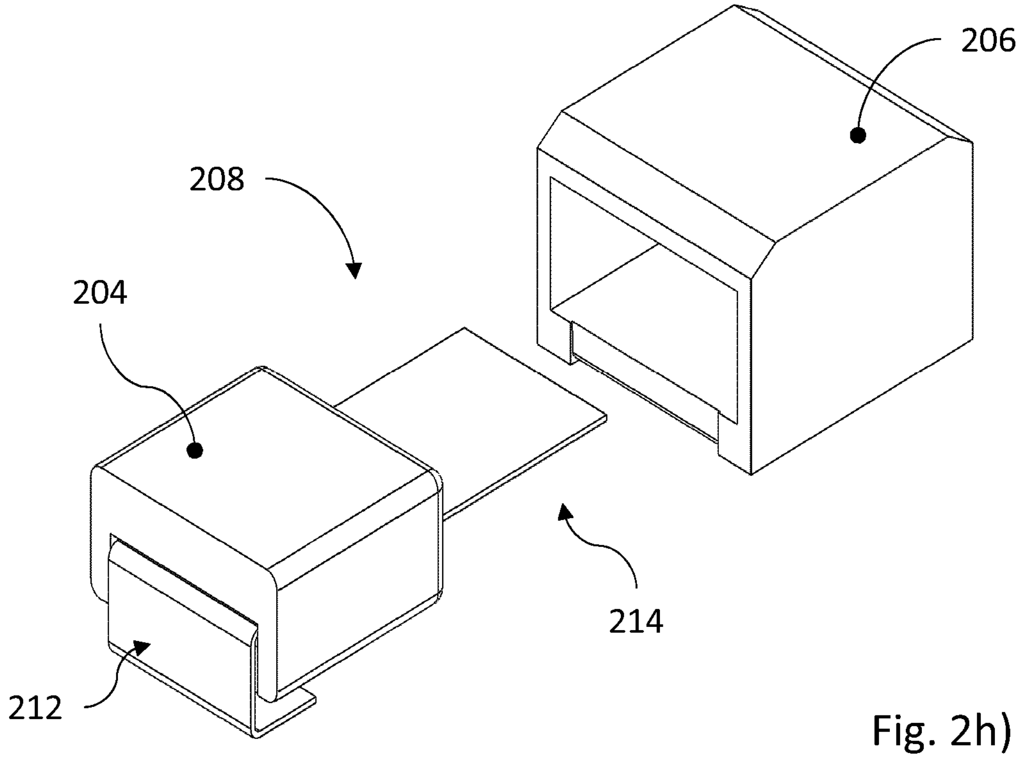
Figure 2I:
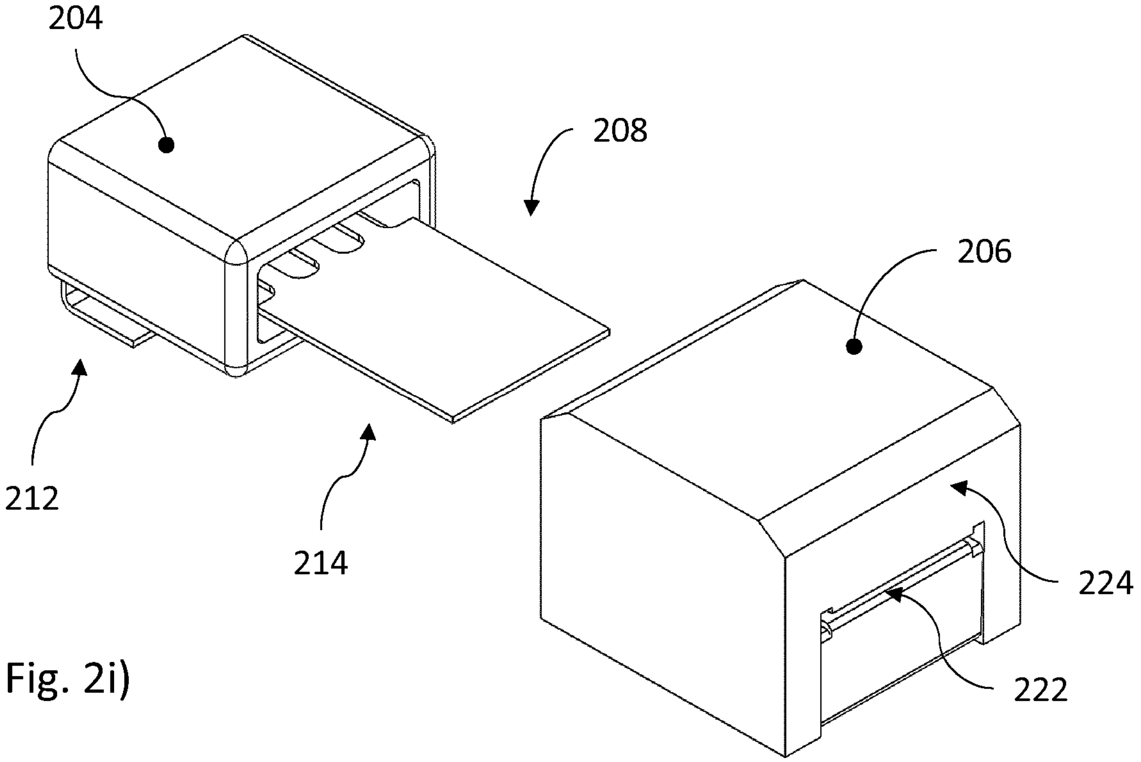
Figure 2J:
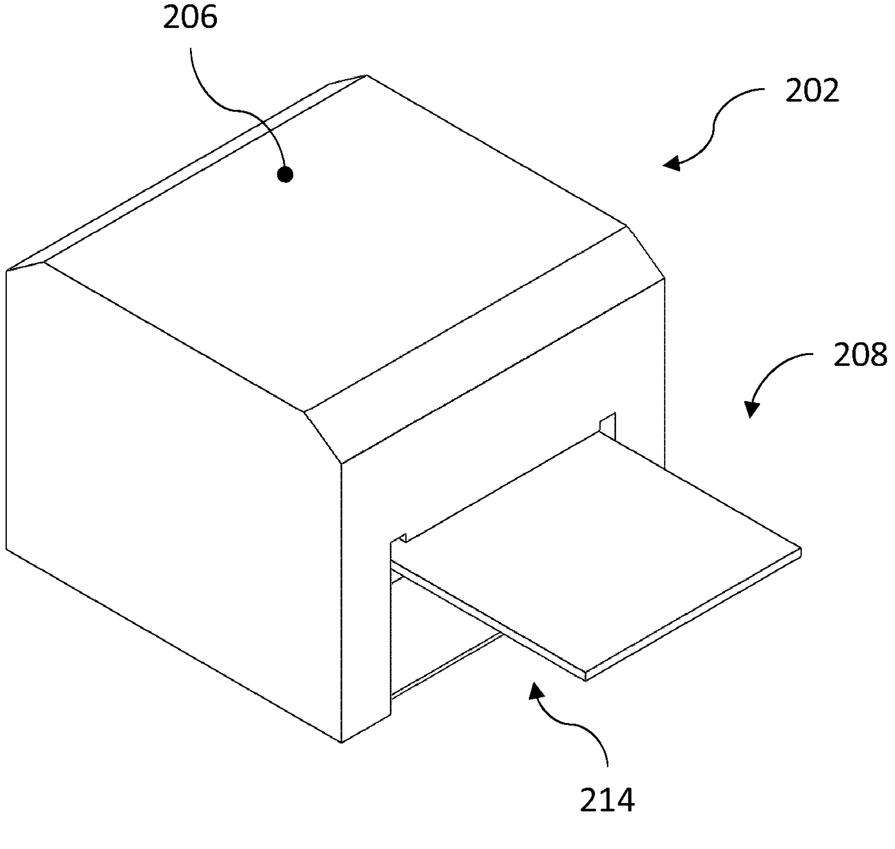

In a next step, the first part 204 (equipped with the electrical conductor element 208) and the second part 206 are slidingly engaged with each other (refer to FIGS. 2*h*) and 2*i*)). In the engaged state, the (rear) wall 224 comprised by the second part 206 covers the access opening 218 of the first part 204 (refer to FIG. 2*j*). Hence, the melting section 210 of the electrical conductor element 208 resides in the interior space 216 of the multi-part housing 202 while properly sealed against the exterior thereof (refer to FIGS. 2*c*) and 2*d*)). In a next step, the second extension section 214, in at least a portion thereof, can be bended. Said bending can e.g. performed such to engage an outer surface portion of the second part 206, thus properly attaching or rather arresting the first part 204 and second part 206 to each other. In the shown aspect, a portion of the second extension section 214 is bended such to correspond to the pre-bended portion of the first extension section 212 (also refer to FIGS. 2*c*) and 2*d*).

In the shown aspect, the cross-section of the first extension section 212 of the electrical conductor element 208 corresponds in form and dimension to the cross-section of the first opening 220 of the first part 204. Further, the cross-section of the second extension section 214 of the electrical conductor element 208 corresponds in form and dimension to the cross-section of the second opening 222 of the second part 206.

In the thus assembled state, the first extension section 212 comprised by the electrical conductor element 208 seals the first opening 220 of the first part 204, and the second extension section 214 comprised by the electrical conductor element 208 seals the second opening 222 of the second part 206.

The walls of the multi-part housing 202, the first extension section 212 of the electrical conductor element 208 and the second extension section 214 of the electrical conductor element 208 together form a dust-tight multi-part housing 202. Gaps between the multi-part housing 202 and the first extension section 212 and second extension section 214 of the electrical conductor element 208 can be dimensioned small enough that no dust can pass across the gaps. This prevents on the one hand dust particles from entering into the multi-part housing 202 from outside the electrical fuse 200 and on the other hand protects the surrounding of the electrical fuse 200 from particles produced as consequence of blowing the electrical conductor element 208.

Consequently, the interior space 216 of the multi-part housing 202 can be properly sealed, while the first part 204 and second part 206 can be properly attached to each other without further connecting means.

Subsequently to the step of mounting the electrical conductor element 208 to the first part 204, the interior space 216 can be filled with a filling material 226 comprising e.g. an arc quenching material, as schematically depicted in FIG. 2*d*). Advantageously, the access opening 218 is formed widened such to easily allow filling the interior space 216 with the filling material 226. Once the first part 204 and second part 206 of the multi-part housing 202 are engaged, the (back) wall 224 comprised by the second part 206 properly covers or rather seals the access opening 218 against the exterior such to reliably retain the filling material 226 inside the interior space 216.

FIGS. 3*a*) to 3*c*) show different views of an electrical fuse 300 according to the invention in a third aspect, while FIGS. 3*d*) to 3*i*) show different states during manufacturing the electrical fuse 300 according to the invention in the third aspect.

The electrical fuse 300 comprises an electrically insulating, multi-part housing 302 comprising a first part 304 and a lid-like second part 306. In the assembled state, the first part 304 and second part 306 are slidingly engaged to each other to be explained in further detail in the following.

The electrical fuse 300 further comprises an electrical conductor element 308. In the shown aspect, the electrical conductor element 308 comprises a sheet metal. The electrical conductor element 308 comprises a melting section 310, a first extension section 312 and a second extension section 314, all sections integrally formed. The first extension section 312 and second extension section 314, respectively, extend from both ends of the melting section 310 in the lengthwise direction. The melting section 310 of the electrical conductor element 308 can be formed of e.g. parallel strips with reduced width as compared to the widths of the first extension section 312 and second extension section 314.

In the assembled state, the multi-part housing 302 encloses the melting section 310 in an interior space 316 of the multi-part housing 302. The first part 304 comprises a (front) access opening 318 allowing access to the interior space 316. In the assembled state, the first part 304 and second part 306 are engaged or rather arranged such that the second part 306 covers the access opening 318 of the first part 304 to the interior space 316.

The first part 304 comprises a first opening 320 and the second part 306 comprises a second opening 322 opposite to the first opening 320 of the first part 304. Said first opening 320 and second opening 322 being penetrated by the first extension section 312 and second extension section 314, respectively. A wall 324 comprised by the second part 306 covers the access opening 318 of the first part 304.

In assembling the electrical fuse 300, the electrical conductor element 308 is mounted to the first part 304 by guiding the first extension section 312 and second extension section 314 via the first opening 320 of the first part 304 such that the melting section 310 of the electrical conductor element 308 resides in the interior space 316 (refer to FIGS. 3*d*) to 3*h*)). The first extension section 312 can be pre-bended.

Figure 3G:
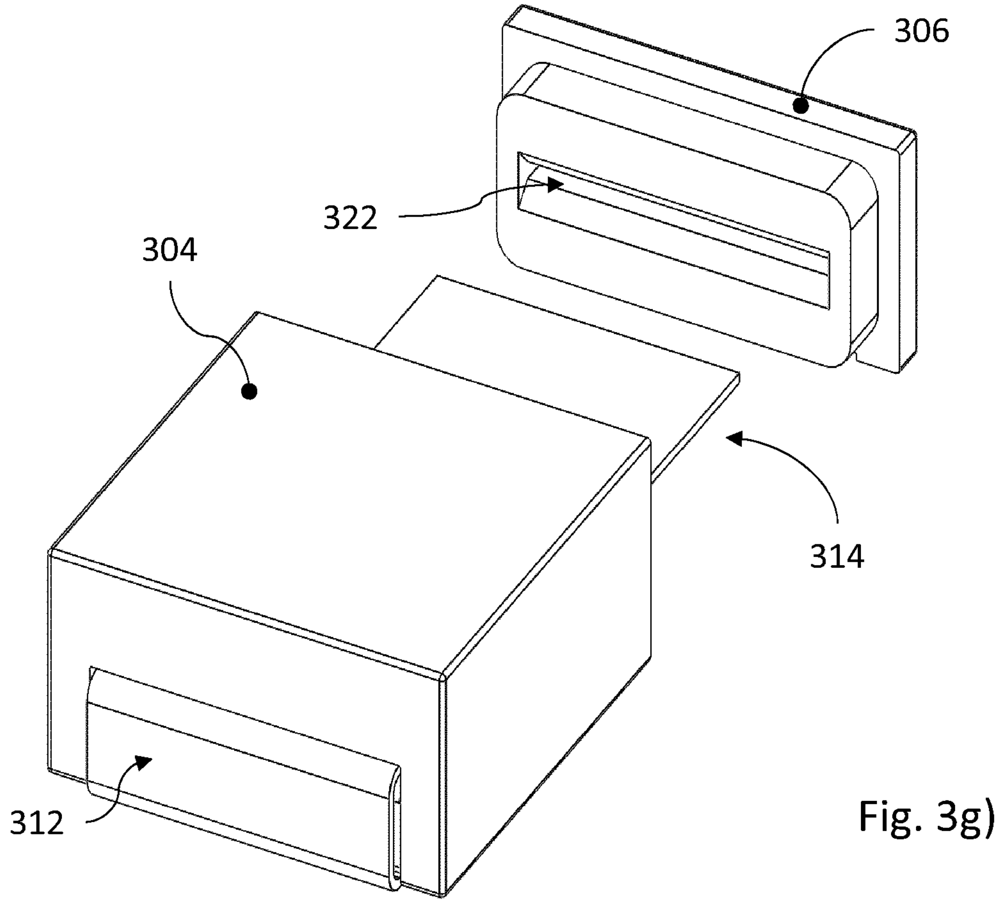
Figure 3H:
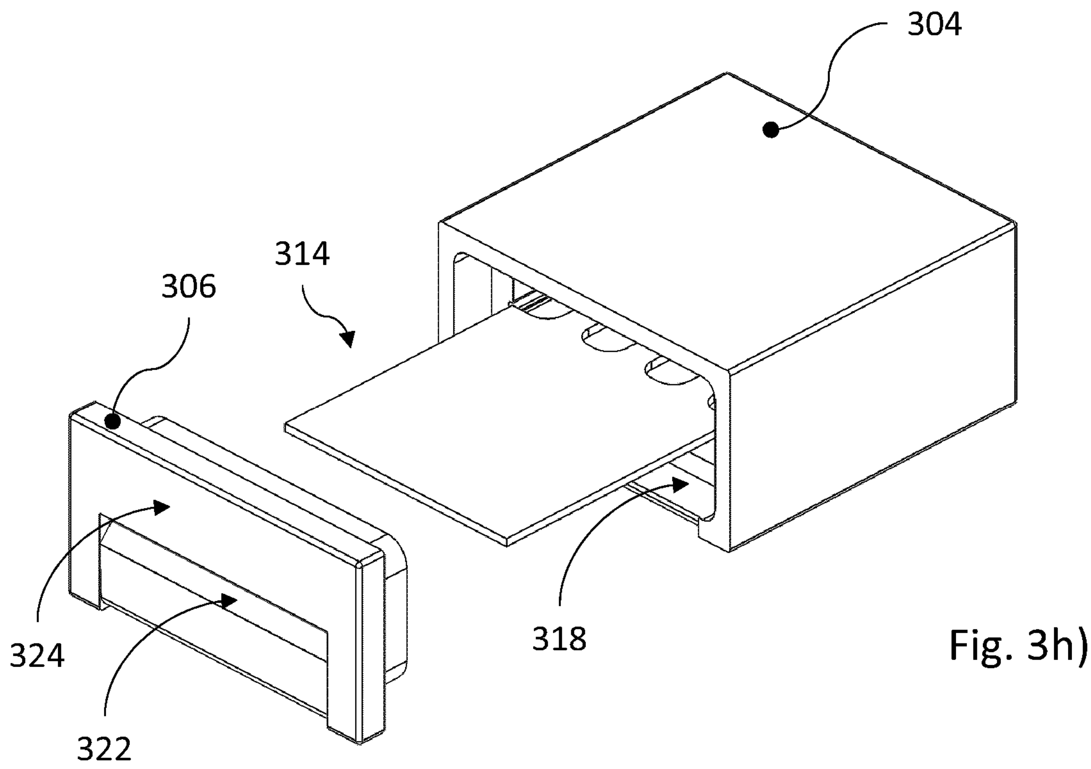
Figure 3I:
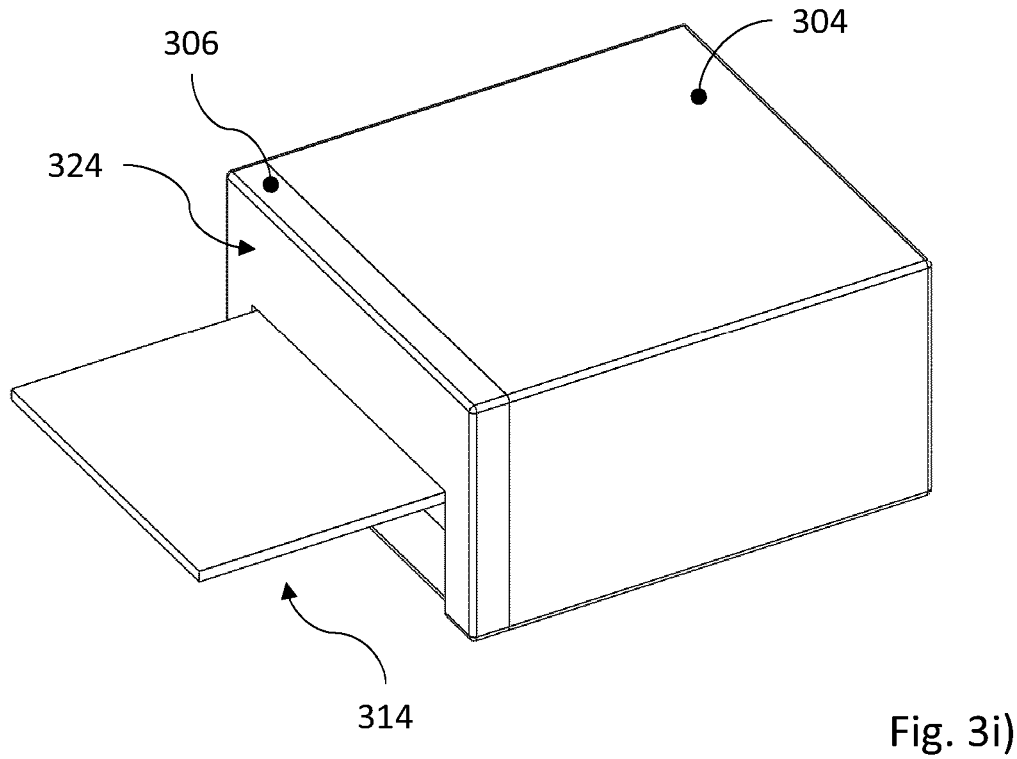

In a next step, the first part 304 (equipped with the electrical conductor element 308) and the second part 306 are slidingly engaged with each other (refer to FIGS. 3*g*) and 3*h*)). In the engaged state, the wall 324 comprised by the lid-like second part 306 covers the access opening 318 of the first part 304 (refer to FIG. 3*i*). Hence, the melting section 310 of the electrical conductor element 308 resides in the interior space 316 of the multi-part housing 302 while properly sealed against the exterior thereof (refer to FIGS. 3*b*) and 3*c*)). In a next step, the second extension section 314, in at least a portion thereof, can be bended. Said bending can e.g. performed such to engage an outer surface portion of the second part 306, thus properly attaching or rather arresting the first part 304 and second part 306 to each other. In the shown aspect, a portion of the second extension section 314 is bended such to correspond to the pre-bended portion of the first extension section 312 (also refer to FIGS. 3*b*) and 3*c*).

In the shown aspect, the cross-section of the first extension section 312 of the electrical conductor element 308 corresponds in form and dimension to the cross-section of the first opening 320. Further, the cross-section of the second extension section 314 of the electrical conductor element 308 corresponds in form and dimension to the cross-section of the second opening 322 of the second part 306.

In the thus assembled state, the first extension section 312 comprised by the electrical conductor element 308 seals the first opening 320 of the first part 304, and the second extension section 314 comprised by the electrical conductor element 308 seals the second opening 322 of the second part 306.

The walls of the multi-part housing 302, the first extension section 312 of the electrical conductor element 308 and the second extension section 314 of the electrical conductor element 308 together form a dust-tight multi-part housing 302. Gaps between the multi-part housing 302 and the first extension section 312 and second extension section 314 of the electrical conductor element 308 can be dimensioned small enough that no dust can pass across the gaps. This prevents on the one hand dust particles from entering into the multi-part housing 302 from outside the electrical fuse 300 and on the other hand protects the surrounding of the electrical fuse 300 from particles produced as consequence of blowing the electrical conductor element 308.

Consequently, the interior space 316 of the multi-part housing 302 can be properly sealed, while at the same time the first part 304 and second part 306 can be properly attached to each other without further connecting means.

Subsequently to the step of mounting the electrical conductor element 308 to the first part 304, the interior space 316 can be filled with a filling material 326 comprising e.g. an arc quenching material, as schematically depicted in FIG. 3*c*). Advantageously, the access opening 318 is formed widened such to easily allow filling the interior space 316 with the filling material 326. Once the first part 304 and second part 306 of the multi-part housing 302 are engaged, the wall 324 comprised by the second part 306 properly covers or rather seals the access opening 318 against the exterior such to reliably retain the filling material 326 inside the interior space 316.

FIGS. 4*a*) to 4*c*) show different views of an electrical fuse 400 according to the invention in a fourth aspect, while FIGS. 4*d*) to 4*i*) show different states during manufacturing the electrical fuse 400 according to the invention in the fourth aspect.

The electrical fuse 400 comprises an electrically insulating, multi-part housing 402 comprising a first part 404 and a second part 406. In the assembled state, the first part 404 and second part 406 are slidingly engaged to each other to be explained in further detail in the following.

The electrical fuse 400 further comprises an electrical conductor element 408. In the shown aspect, the electrical conductor element 408 comprises a sheet metal. The electrical conductor element 408 comprises a melting section 410, a first extension section 412 and a second extension section 414, all sections integrally formed. The first extension section 412 and second extension section 414, respectively, extend from both ends of the melting section 410 in the lengthwise direction. The melting section 410 of the electrical conductor element 408 can be formed of e.g. parallel strips with reduced width as compared to the widths of the first extension section 412 and second extension section 414.

In the assembled state, the multi-part housing 402 encloses the melting section 410 in a well-like interior space 416 of the multi-part housing 402. The first part 404 comprises an access opening 418 allowing access to the well-like interior space 416 from above. In the assembled state, the first part 404 and second part 406 are engaged or rather arranged such that the second part 406 covers the access opening 418 of the first part 404 to the interior space 416.

The first part 404 comprises a first opening 420 and a second opening 422 opposite to the first opening 418. Said first opening 420 and second opening 422 being penetrated by the first extension section 412 and second extension section 414, respectively. A wall 424 comprised by the second part 406 covers the access opening 418 of the first part 404 from above.

In assembling the electrical fuse 400, the electrical conductor element 408 is mounted to the first part 404 by guiding the second extension section 414 and first extension section 412 via the first opening 420 and second opening 422 of the first part 404 such that the melting section 410 of the electrical conductor element 408 resides in the interior space 416 of the first part 404 (refer to e.g. FIGS. 4*d*) and 4*e*)). The first extension section 412 can be pre-bended.

Figure 4G:
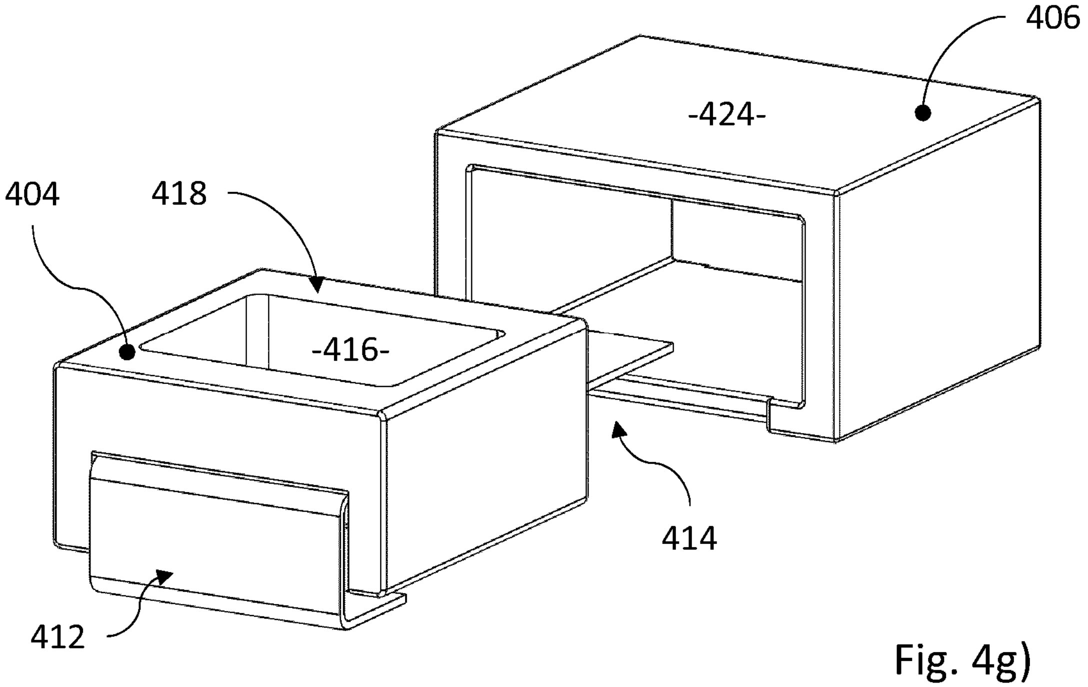
Figure 4H:
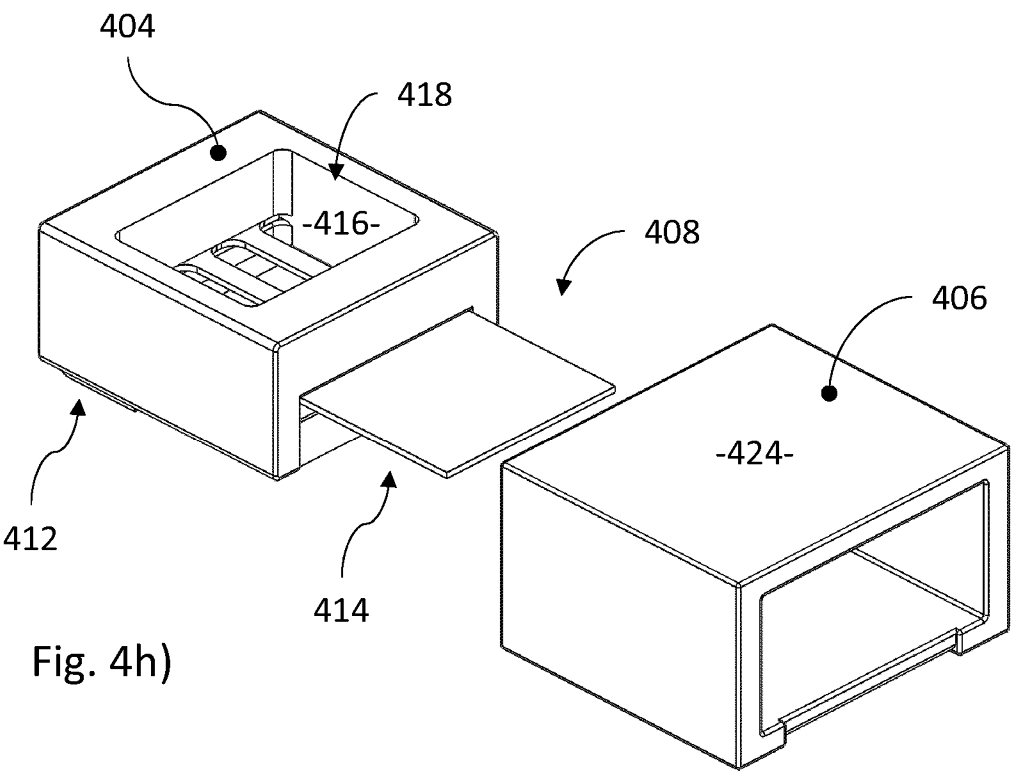
Figure 4I:
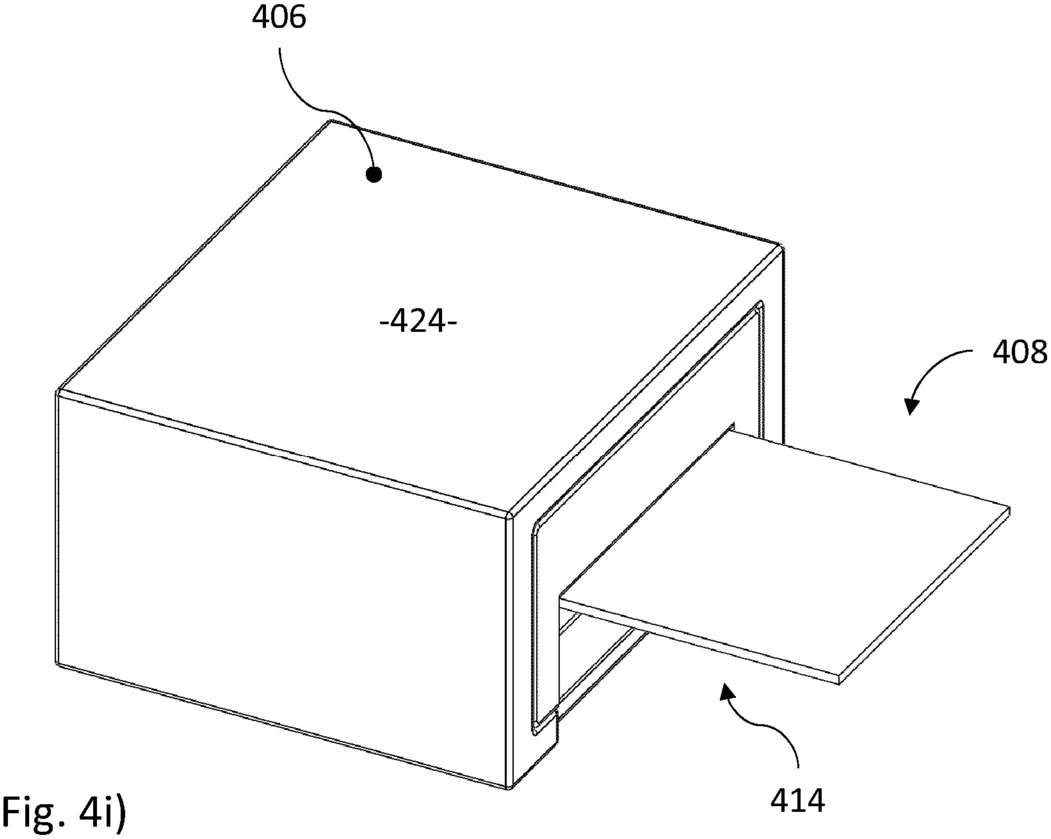

In a next step, the first part 404 (equipped with the electrical conductor element 408) and the second part 406 are slidingly engaged with each other (refer to FIGS. 4*g*) and 4*h*)). In the engaged state, the wall 424 comprised by the second part 406 covers the access opening 418 of the first part 404 from above (refer to FIG. 4*i*)). Hence, the melting section 410 of the electrical conductor element 408 is placed in the interior space of the multi-part housing 402 while properly sealed against the exterior thereof. In a next step, the second extension section 414, in at least a portion thereof, can be bended. Said bending can e.g. performed such to engage an outer surface portion of the second part 406, thus properly attaching or rather arresting the first part 404 and second part 406 to each other. In the shown aspect, a portion of the second extension section 414 is bended such to correspond to the pre-bended portion of the first extension section 412 (refer to FIGS. 4*b*) and 4*c*).

In the shown aspect, the cross-section of the first extension section 412 of the electrical conductor element 408 corresponds in form and dimension to the cross-section of the first opening 420. Further, the cross-section of the second extension section 414 of the electrical conductor element 408 corresponds in form and dimension to the cross-section of the second opening 422.

In the thus assembled state, the first extension section 412 comprised by the electrical conductor element 408 seals the first opening 420 of the first part 404, and the second extension section 414 comprised by the electrical conductor element 408 seals the second opening 422 of the first part 404.

The walls of the multi-part housing 402, the first extension section 412 of the electrical conductor element 408 and the second extension section 414 of the electrical conductor element 408 together form a dust-tight multi-part housing 402. Gaps between the multi-part housing 402 and the first extension section 412 and second extension section 414 of the electrical conductor element 408 can be dimensioned small enough that no dust can pass across the gaps. This prevents on the one hand dust particles from entering into the multi-part housing 402 from outside the electrical fuse 400 and on the other hand protects the surrounding of the electrical fuse 400 from particles produced as consequence of blowing the electrical conductor element 408.

Consequently, the interior space 416 of the multi-part housing 102 can be properly sealed, while at the same time the first part 404 and second part 406 can be properly attached to each other without further connecting means.

Subsequently to the step of mounting the electrical conductor element 408 to the first part 404, the well-like interior space 416 can be filled with a filling material 426 comprising e.g. an arc quenching material, as schematically depicted in FIG. 4*c*). Advantageously, the access opening 418 is formed widened such to easily allow filling the interior space 416 with the filling material 426 from above. Further advantageously, the orientation of the first part 404 can remain unchanged while engaging the first part 404 and second part 406 to each other.

Once the first part 404 and second part 406 of the multi-part housing 402 are engaged, the wall 424 comprised by the second part 406 properly covers or rather seals the access opening 418 against the exterior such to reliably retain the filling material 426 inside the interior space 416.

FIGS. 5*a*) to 5*c*) show different views of an electrical fuse 500 according to the invention in a fifth aspect, while FIGS. 5*d*) to 5*h*) show different states during manufacturing the electrical fuse 500 in the fifth aspect.

The electrical fuse 500 comprises an electrically insulating, multi-part housing 502 comprising a first part 504 and a second part 506. In the assembled state, the first part 504 and second part 506 are slidingly engaged to each other to be explained in further detail in the following.

The electrical fuse 500 further comprises an electrical conductor element 508. In the shown aspect, the electrical conductor element 508 comprises a sheet metal. The electrical conductor element 508 comprises a melting section 510, a first extension section 512 and a second extension section 514, all sections integrally formed. The first extension section 512 and second extension section 514, respectively, extend from both ends of the melting section 510 in the lengthwise direction. The melting section 510 of the electrical conductor element 508 can be formed of e.g. parallel strips with reduced width as compared to the widths of the first extension section 512 and second extension section 514.

In the assembled state, the multi-part housing 502 encloses the melting section 510 in an interior space 516 of the multi-part housing 502. The first part 504 comprises an access opening 518 allowing access to the interior space 516. In the assembled state, the first part 504 and second part 506 are engaged or rather arranged such that the second part 506 covers the access opening 518 of the first part 504 to the interior space 516.

The first part 504 further comprises a first opening 520 and a second opening 522 opposite to the first opening 520. Said first opening 520 and second opening 522 being penetrated by the first extension section 512 and second extension section 514, respectively. A (lateral) wall 524 comprised by the second part 506 covers the access opening 518 of the first part 504.

In assembling the electrical fuse 500, the electrical conductor element 508 is mounted to the first part 504 by laterally guiding the first extension section 512 and second extension section 514 of the conductor element 508 via the first opening 520 and second opening 522 of the first part 504 such that the melting section 510 of the electrical conductor element 508 is enclosed or rather resides in the interior space 516 (refer to FIGS. 5*b*) and 5*c*)). The first extension section 512 can be pre-bended.

Figure 5F:
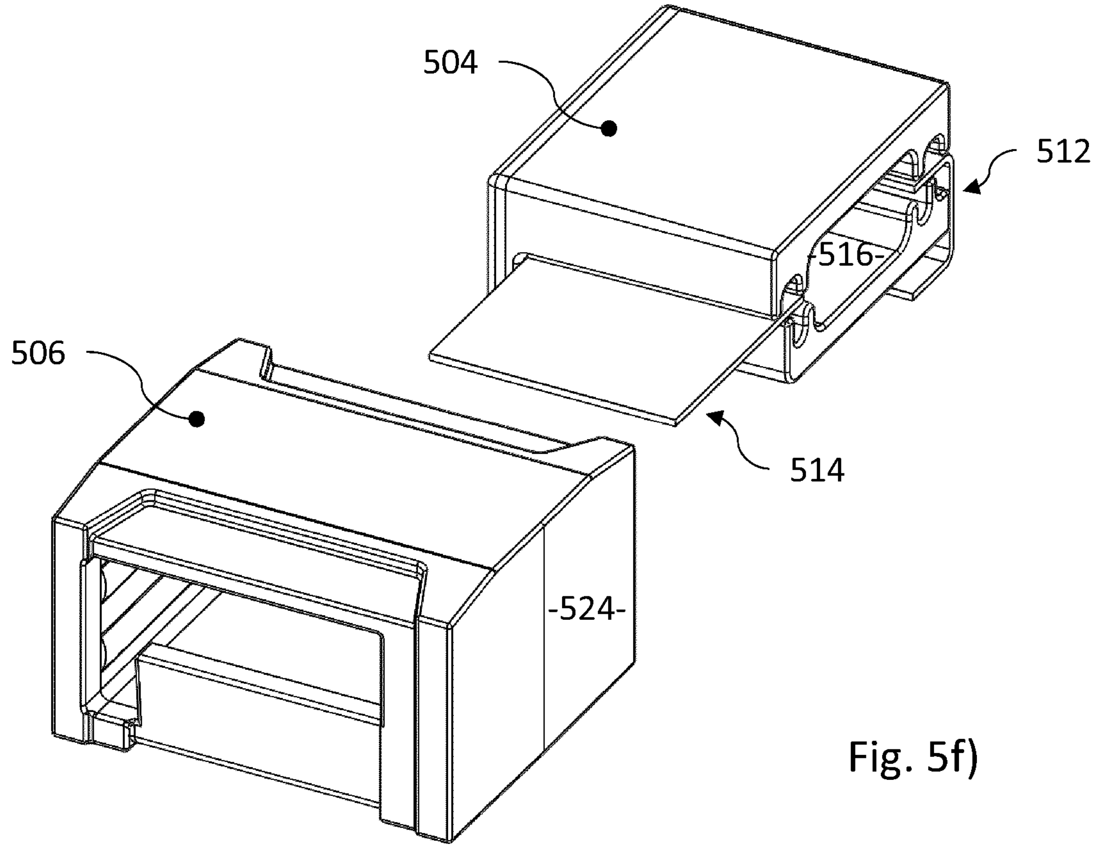
Figure 5G:
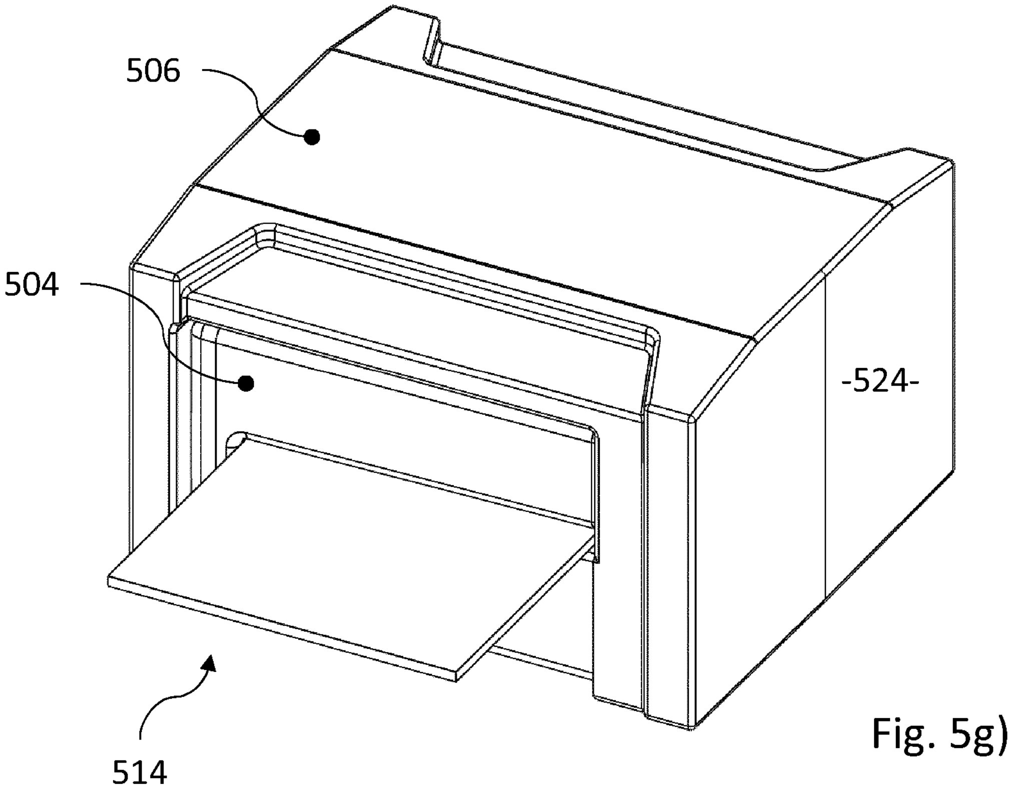
Figure 5H:
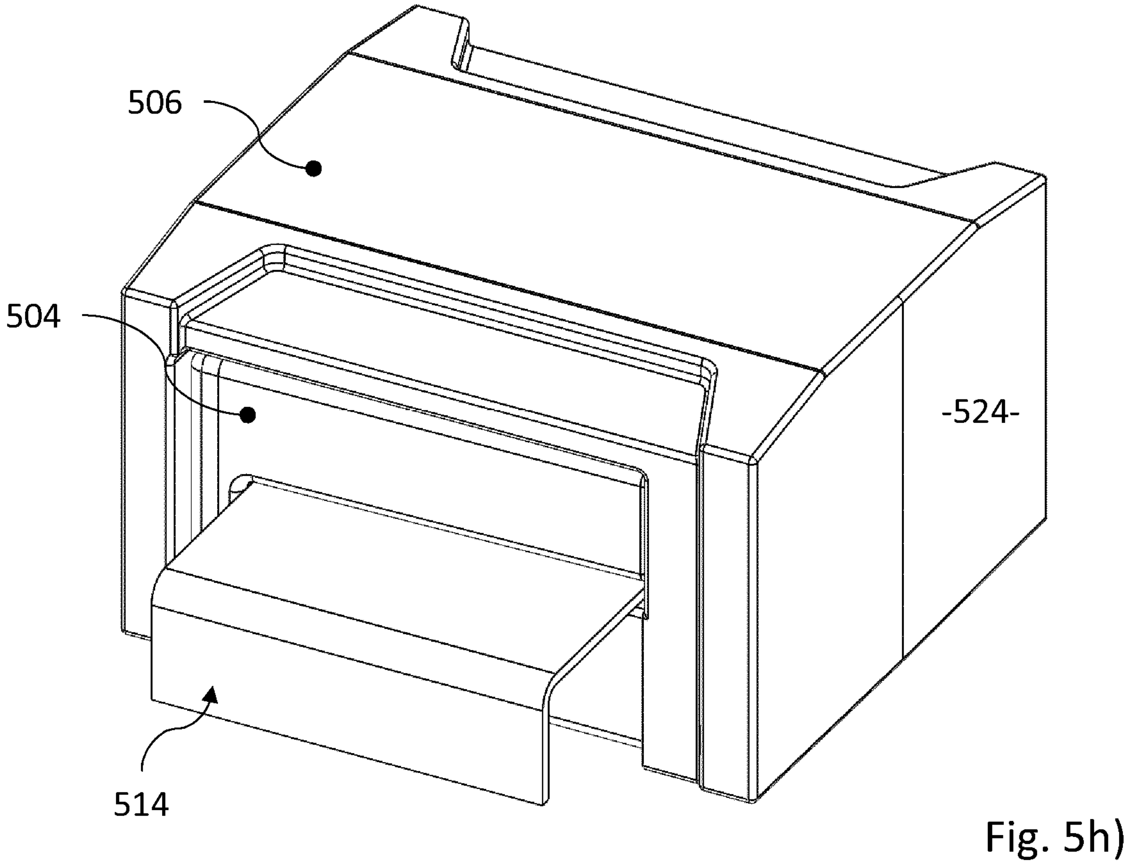

In a next step, the first part 504 (equipped with the electrical conductor element 508) and the second part 506 are slidingly engaged with each other (refer to FIG. 5*f*)). In the engaged state, the (lateral) wall 524 comprised by the second part 506 covers the access opening 518 of the first part 504 (refer to FIGS. 5*g*) and 5*h*)). Hence, the melting section 510 of the electrical conductor element 508 is placed in the interior space 516 of the multi-part housing 502 while properly sealed against the exterior thereof. In a next step, the second extension section 514, in at least a portion thereof, can be bended. Said bending can e.g. performed such to engage an outer surface portion of the second part 506, thus properly attaching or rather arresting the first part 504 and second part 506 to each other. Hence, no further means and/or steps for attaching, e.g. gluing, etc., are required. In the shown aspect, a portion of the second extension section 514 is bended such to correspond to the pre-bended portion of the first extension section 512 (refer to FIGS. 5*b*) and 5*c*)).

In the shown aspect, in a cross-sectional view of the first part 504 in a longitudinal direction thereof, the first opening 520 and second opening 522 are formed in a W-shape. Said shape of the openings proper improves sealing against small particles even if manufacturing tolerances may not allow for openings with sufficiently small dimensions. While not shown, only one of the first opening and second opening can be formed in the W-shape. Further, while not shown, the first opening and/or second opening can be formed in different shapes, e.g. a V-shape, etc. Further, while not shown, the first opening and/or second opening can be formed in a reversed W-shape or reversed V-shape.

In the thus assembled state, the first extension section 512 comprised by the electrical conductor element 508 seals the first opening 520 of the first part 504, and the second extension section 514 comprised by the electrical conductor element 508 seals the second opening 522 of the first part 504.

The walls of the multi-part housing 502, the first extension section 512 of the electrical conductor element 508 and the second extension section 514 of the electrical conductor element 508 together form a dust-tight, multi-part housing 502. Gaps between the multi-part housing 502 and the first extension section 512 and second extension section 514 of the electrical conductor element 508 can be dimensioned small enough that no dust can pass across the gaps. This prevents on the one hand dust particles from entering into the multi-part housing 502 from outside the electrical fuse 500 and on the other hand protects the surrounding of the electrical fuse 500 from particles produced as consequence of blowing the electrical conductor element 508. Consequently, the interior space 516 of the multi-part housing 502 can be properly sealed, while the first part 504 and second part 506 can be properly attached to each other without further connecting means.

Subsequently to the step of mounting the electrical conductor element 508 to the first part 504, the interior space 516 can be filled with a filling material 526 comprising e.g. an arc quenching material, as schematically depicted in FIG. 5*c*). Advantageously, the access opening 518 is formed widened such to easily allow filling the interior space 516 with the filling material 526. Once the first part 504 and second part 506 of the multi-part housing 502 are engaged, the wall 524 comprised by the second part 506 properly covers or rather seals the access opening 518 against the exterior such to reliably retain the filling material 526 inside the interior space 516.

The invention claimed is:

1. An electrical fuse comprising:
- an electrical conductor element comprising a melting section and further comprising a first extension section and a second extension section both integrally formed with the melting section and extending from both ends of the melting section in the lengthwise direction thereof,
- an electrically insulating, multi-part housing, which encloses said melting section in an interior space,
- wherein the multi-part housing comprises a first part and a second part slidingly engaged with said first part and arranged such that the second part covers an access opening of the first part to the interior space, and
- wherein the first extension section and the second extension section comprise a terminal area, respectively, both terminal areas are arranged outside the multi-part housing, and
- wherein the first part comprises a first opening, the second part comprises a second opening opposite to the first opening of the first part, the first opening being directly sealingly penetrated by the first extension section, and the second opening being directly sealingly penetrated by the second extension section.

2. The electrical fuse according to claim 1, wherein the first extension section comprised by the electrical conductor element seals said first opening, and wherein the second extension section comprised by the electrical conductor element seals said second opening.

3. The electrical fuse according to claim 2, wherein a cross-section of said first extension section of the electrical conductor element perpendicular to the lengthwise direction thereof corresponds in form and dimension to the cross-section of said first opening and/or wherein the cross-section of said second extension section of the electrical conductor element perpendicular to the lengthwise direction thereof corresponds in form and dimension to the cross-section of said second opening.

4. The electrical fuse according to claim 2, wherein the first opening and second opening in a cross-sectional view of the multi-part housing in a plane parallel to the lengthwise direction of the melting section of the electrical conductor element are formed in a V-shape or W-shape.

5. The electrical fuse according to claim 1, wherein said electrical conductor element is a sheet metal.

6. The electrical fuse according to claim 1, further comprising a filling material filled in the interior space.

7. The electrical fuse according to claim 6, wherein the filling material comprises a material having arc extinction capability.

8. The electrical fuse according to claim 6, wherein the filling material comprises at least one of sand, silicone, glass beads and ceramic beads.

9. A method of manufacturing an electrical fuse, said method comprising the steps:

a) providing an electrical conductor element comprising a melting section and further comprising a first extension section and a second extension section both integrally formed with the melting section and extending from both ends of the melting section in the lengthwise direction thereof, b) providing an electrically insulating, multi-part housing comprising a first part and a second part, c) introducing the electrical conductor element into the multi-part housing such that the melting section is enclosed in an interior space thereof, d) slidingly engaging the first and second parts in relation to each other thus covering by the second part an access opening of the first part to the interior space, wherein:

step b) further comprises providing the first part with a first opening and the second part with a second opening opposite to the first opening once the first part and the second part are engaged, step c) further comprises introducing the electrical conductor element through said first opening and through said second opening such that said first opening is directly sealingly penetrated by the first extension section and the second opening is directly sealingly penetrated by the second extension section.

10. The method according to claim 9, further comprising the step of:

e) bending the first extension section and/or second extension section such to abut at least partially against outer wall sections of the multi-part housing.

11. The method according to claim 9, wherein step d) is preceded by the step of:

filling a filling material into the interior space through the access opening.

* * * * *